United States Patent [19]

Platteschorre et al.

[11] Patent Number: 4,862,790

[45] Date of Patent: Sep. 5, 1989

[54] EGG COOKING APPARATUS

[76] Inventors: Kornelis Platteschorre, 4273 Mohave Ct., Grandville, Mich. 49418; Harry W. Herbruck, Jr., 6425 W. Grand River, Saranac, Mich. 48881

[21] Appl. No.: 123,598

[22] Filed: Nov. 20, 1987

[51] Int. Cl.⁴ .............................................. A47J 43/20
[52] U.S. Cl. ..................................... 99/353; 99/373; 99/427; 99/440
[58] Field of Search .......................... 99/325, 372–374, 99/377, 380, 426, 427, 440, 443 C, 339, 352, 353, 355, 357; 198/494, 496, 497; 15/256.5

[56] References Cited

U.S. PATENT DOCUMENTS

| 170,975 | 12/1875 | Wetmore . | |
|---|---|---|---|
| 211,859 | 2/1879 | Manley . | |
| 275,730 | 4/1883 | Swan . | |
| 277,402 | 5/1883 | Baggs . | |
| 2,083,864 | 6/1937 | Puckett | 198/496 |
| 2,226,844 | 12/1940 | Carr . | |
| 2,421,199 | 5/1947 | Gutmann . | |
| 2,541,403 | 2/1951 | Carl | 198/496 |
| 3,161,156 | 12/1964 | Batista et al. . | |
| 3,374,728 | 3/1968 | Owens . | |
| 3,712,208 | 1/1973 | Adolphi | 99/440 |
| 3,823,659 | 7/1974 | Hubka et al. | 99/353 |
| 3,980,009 | 9/1976 | Petersen et al. | 99/353 |
| 4,097,018 | 6/1978 | O'Herien | 249/105 |
| 4,303,008 | 12/1981 | Hice et al. | 99/427 X |
| 4,656,928 | 4/1987 | Mack | 99/419 |
| 4,686,895 | 8/1987 | Ishino et al. | 99/440 |

Primary Examiner—Timothy F. Simone
Attorney, Agent, or Firm—Price, Heneveld, Cooper, DeWitt & Litton

[57] ABSTRACT

An automatic egg product cooking apparatus that fills three-piece molds with a uniform amount of egg material. The molds undergo slow, low temperature cooking and the cooked egg product is thereafter dumped and the mold cleaned. The apparatus and method is used to produce a cooked egg product having a uniform volume, and which may vary the cholesterol level while maintaining the size of the product.

76 Claims, 8 Drawing Sheets

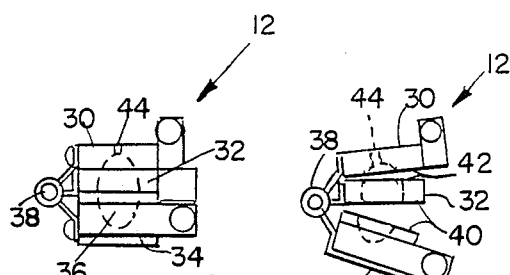
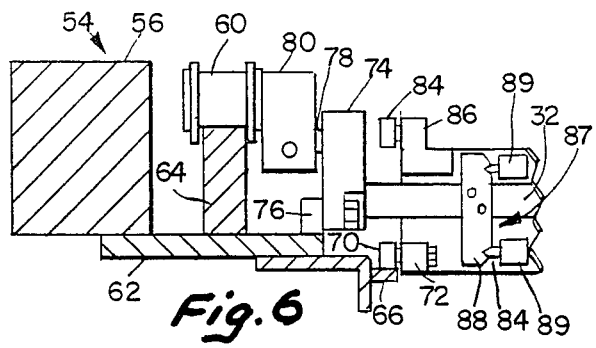
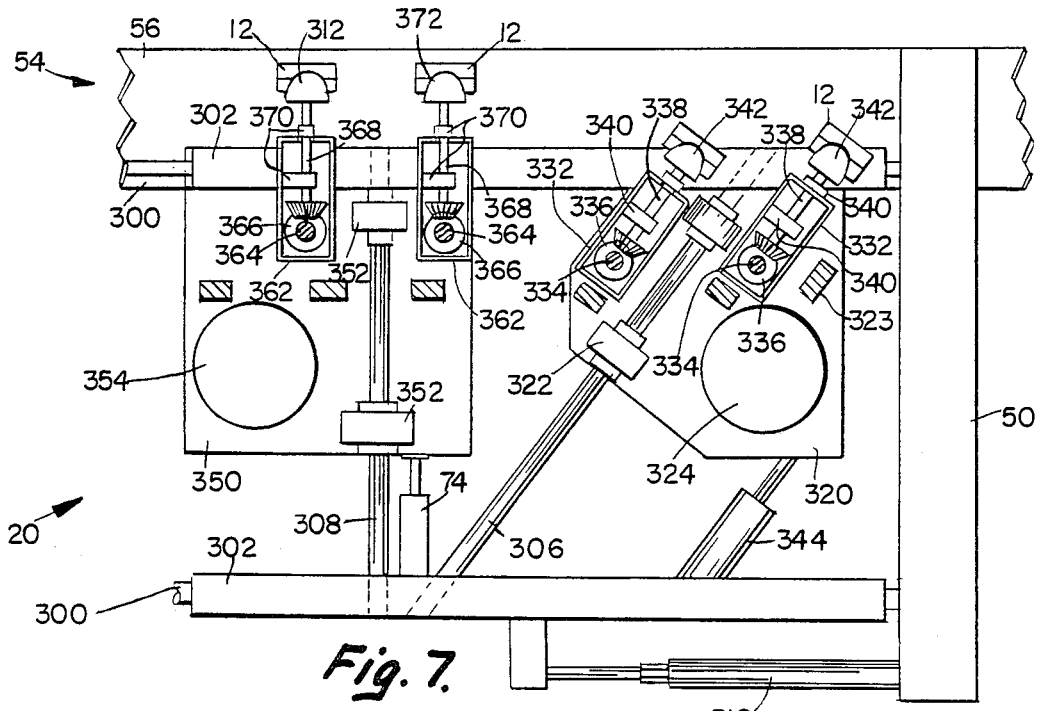
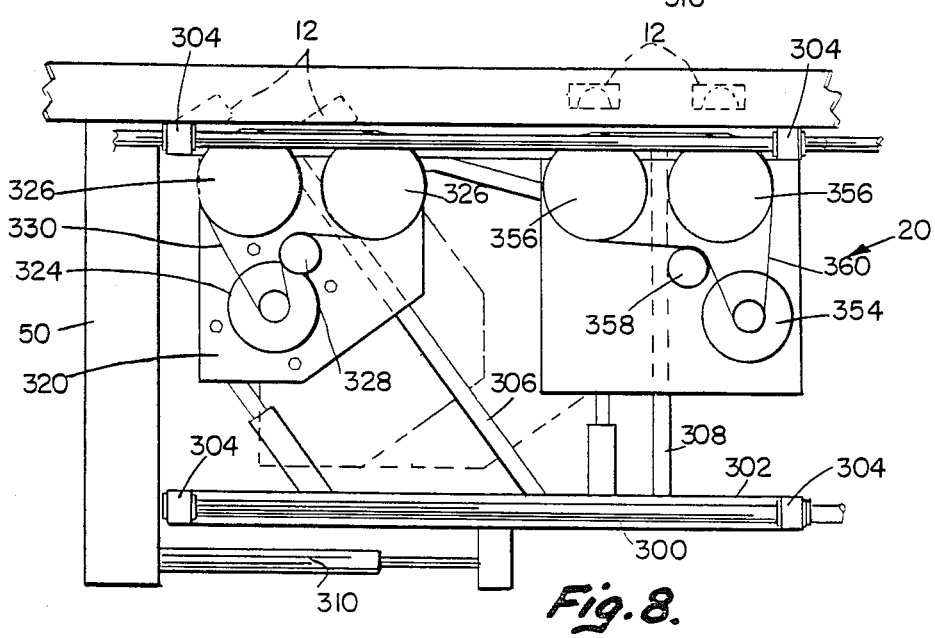

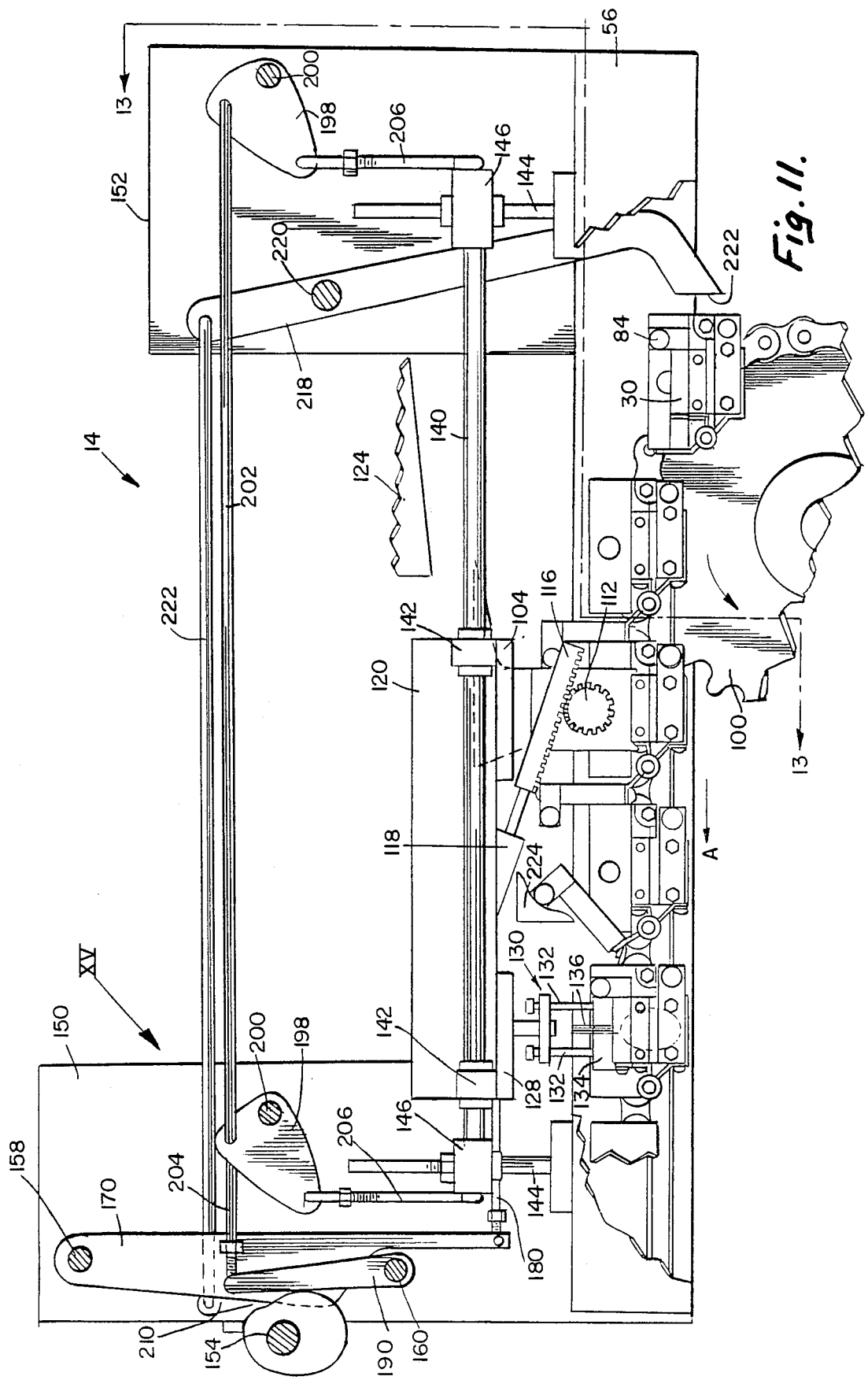

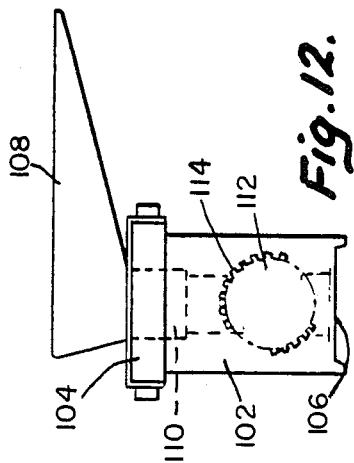
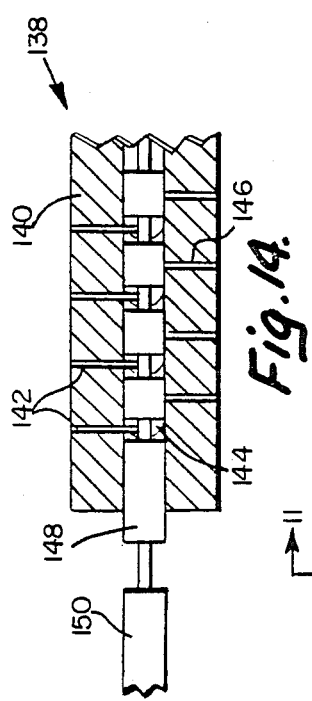
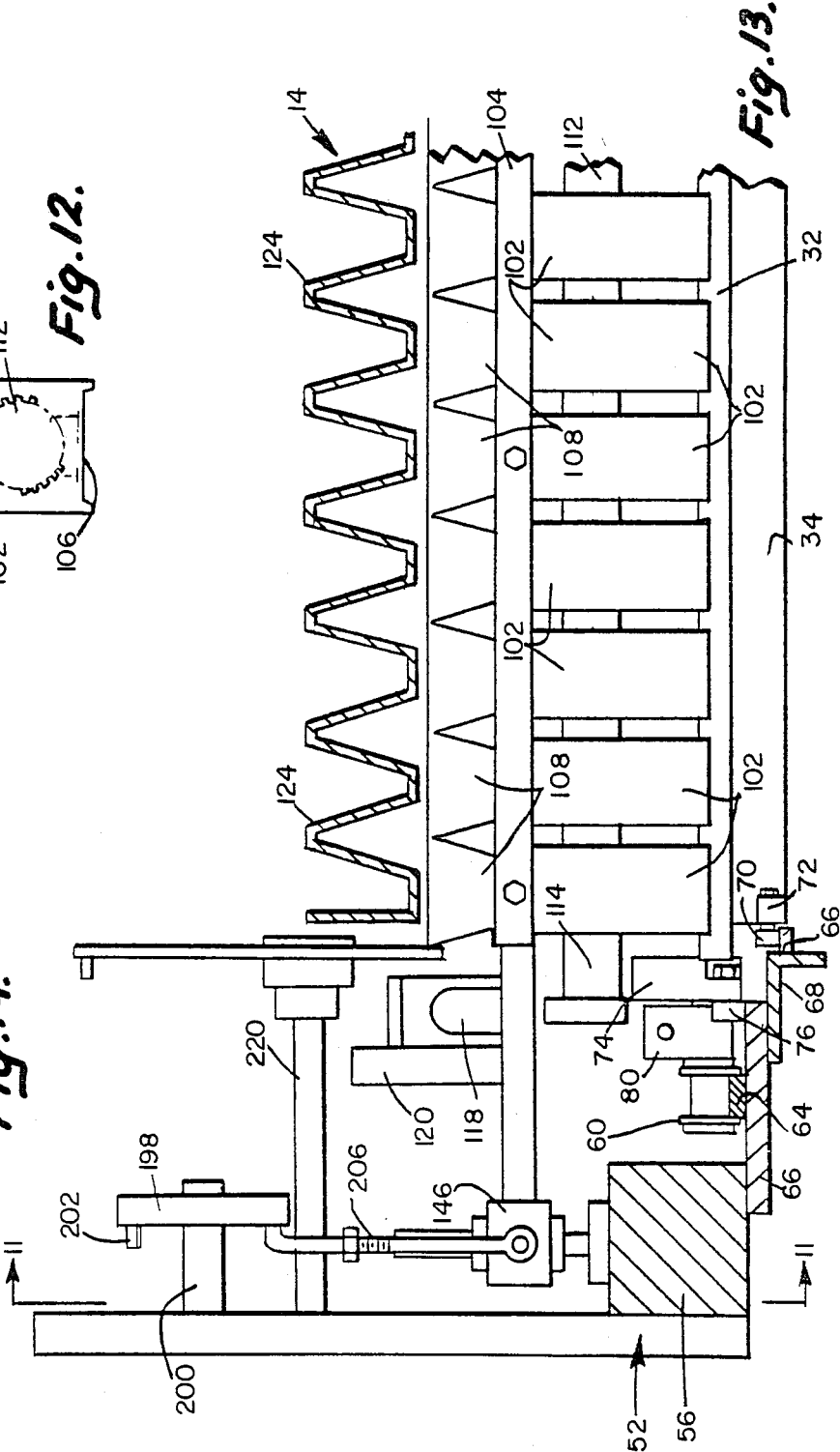

EGG COOKING APPARATUS

BACKGROUND OF THE INVENTION

The present invention relates to the cooking of eggs, and more particularly to apparatus and methods for cooking eggs in an automated process that retains the oval egg-shape during cooking.

Eggs have long been cooked or prepared individually by consumers using a wide variety of methods. Among these are methods of preparation and cooking which retain the oval shape of the egg, such as by boiling the egg in the shell. Another conventional method is the cooking of eggs in egg coddlers, which provide crucible-like cooking enclosures that may or may not be egg-shaped. An egg is cracked open and emptied into the coddler, and other ingredients may optionally be mixed with the egg in the coddler. The egg coddler is then placed in boiling water in order to cook the contents.

At least one apparatus for the automated cooking of an egg product has been developed. However, such apparatus does not produce an egg-shaped oval egg product but rather a cylindrical tube of cooked egg product. These egg-product cylinders are typically sliced for use by a commercial food service or restaurant, such as in salads or the like. These cylindrical egg products cannot be used in place of natural eggs however when the entire or a major portion of the egg is to be used whole by the consumer. These cylindrical egg products typically include an outer tube of egg white with an inner cylinder of egg yolk. The apparatus for processing such cylinders typically inject the egg white material and egg yolk material through a cylindrical cooking element or coaxial set of cooking elements during cooking, or alternatively mold the two sections separately during cooking and thereafter join the egg white and egg yolk together. During these processes preservatives may be added to the cylindrical or tubular egg product. Although the resulting cylindrical egg product does not itself resemble a natural egg, when sliced the resulting wafers of egg product do resemble a natural egg that has been sliced through the yolk.

Apparatus has also been developed for molding and cooking egg white in cup shapes which also may be used in salads, as deviled eggs or the like. These cup-shaped egg whites do not include a yolk and only provide a hemispherical portion of a normal egg shape.

It is believed that heretofore shelled eggs have not been commercially processed or cooked by automated means so as to retain their normal oval egg shape. Previously, in order to cook eggs so as to retain their normal oval egg shape, at least in large numbers, the eggs were boiled or otherwise cooked in their shell and thereafter the shell peeled from the cooked egg. Peeling a cooked egg is a much more difficult and time-consuming process than cracking open and emptying an egg while in its uncooked state. Further, due to the inability or difficulty in mixing preservatives with an egg white in its shell, the preservation and storage of such hard boiled eggs pose difficulties.

Another problem that has been experienced with the boiling of fresh eggs is that if the egg has not aged sufficiently the cooked egg white adheres to the inside of the shell. The egg is then very difficult to peel and normally results in excessive tearing of the egg white exterior, which is deleterious to the acceptability of the cooked egg. Further, when freshly laid eggs are cooked at boiling water temperatures, quite often the exterior of the eggs acquire a pock-marked appearance. Freshly-laid eggs are therefore either aged somewhat prior to cooking or are not normally cooked in such a manner as to retain their normal oval egg shape.

Still another problem experienced by the egg industry is the natural production of large numbers of medium or small eggs. Although smaller eggs are not defective from a food value standpoint, eggs which are smaller than the standard large grade are not as desirable to consumers and therefore command a lower price. Thus, large quantities of medium or small eggs are more difficult to market than large eggs.

SUMMARY OF THE INVENTION

The present invention is directed to an apparatus and method by which a cooked egg product is produced having a normal oval egg shape. Egg white material and an egg yolk material are placed in a multiple-section mold, which is then conveyed through a cooking oven. The apparatus provides a series of stations through which the mold is transported and at which various different processing steps are performed. The apparatus stations include an egg cracking and mold filling or topping off station, a cooking station, a cooked egg removal station and a mold cleaning station. Preferably a series of molds are conveyed continuously through these stations for the automated production of cooked egg products each having a natural oval egg shape.

Preferably the mold includes three sections that cooperate to define a plurality of egg-shaped cavities. The three sections include at least one opening joint that abuts at the widest diameter of the egg in order to permit the cooked egg to be removed when this joint is opened. With the three sections in a stacked relationship, a top section may be cracked open to release any pressure within the mold, a middle section used to support and convey the mold between stations and a lower section may be pivoted downwardly from the middle section in order to permit the cooked egg product to fall out of the mold.

In the egg cooking method, either a shelled egg or egg white and an egg yolk are introduced into the mold. Additional egg white is introduced into the mold until the egg product reaches a uniform volume. In alternative preferred embodiments, preservatives or other ingredients are mixed with the egg white prior to cooking. Preferably, the egg product is cooked at temperatures ranging around the preferred temperature of one hundred eighty-five degrees Fahrenheit. The egg product is cooked at the preferred temperature for a time ranging around approximately twenty-five to thirty minutes. In one preferred embodiment, a freshly laid egg is used in the cooking process.

With the apparatus and method cooked egg products having a normal oval egg shape are produced by automated processes. Preservatives or other ingredients may be added during processing while retaining the egg shape. The apparatus and method produce uniform volume egg products, so that consumer or retail specifications can be closely maintained. The process may be used with medium or small eggs as starting materials, yet yield a cooked egg product having the volume of a standard large grade egg, thus providing an economical use for less desirable small or medium grade eggs. Since an egg yolk contains a high level of cholesterol, through the use of a small or medium egg as a starting material, a large size egg can be produced with a lower than normal cholesterol level. Further, eggs may be cooked immediately after laying yet produce an egg product having an aesthetically pleasing exterior without pockmarking. Still further, egg products may be produced which have the yolk replaced with other edible materials, by replacing the yolk filling step with a step in which another edible material is dropped into the mold.

These and other advantages or beneficial results will be recognized by one skilled in the art from the description and claims which follow and the drawings appended hereto.

BRIEF DESCRIPTION OF THE DRAWINGS

FIG. 4 is a front elevational view of an egg mold used in the apparatus of FIG. 1, shown in a closed condition;

FIG. 5 is a front elevational view of the egg mold of FIG. 4, shown in a partially open condition;

FIG. 6 is a fragmentary end elevational view of a closed mold taken in the region of arrow VI in FIG. 2;

FIG. 7 is a fragmentary sectional rear view of a mold cleaning apparatus taken in the region of arrow VII in FIG. 1;

FIG. 8 is a fragmentary, front elevational view of the mold cleaning apparatus of FIG. 7;

FIG. 11 is a fragmentary, front elevational view of the mold filling station taken in the region of arrow XI in FIG. 1, and taken along plane XI—XI of FIG. 13;

FIG. 12 is a front elevational view of a mold filling valve used in the mold filling station of FIG. 11;

FIG. 13 is a fragmentary, end sectional view taken along plane XIII—XIII in FIG. 11;

FIG. 14 is a fragmentary, end sectional view of a topping-off valve used in the mold filling station of FIG. 11;

DETAILED DESCRIPTION OF THE PREFERRED EMBODIMENTS

Figure 1:
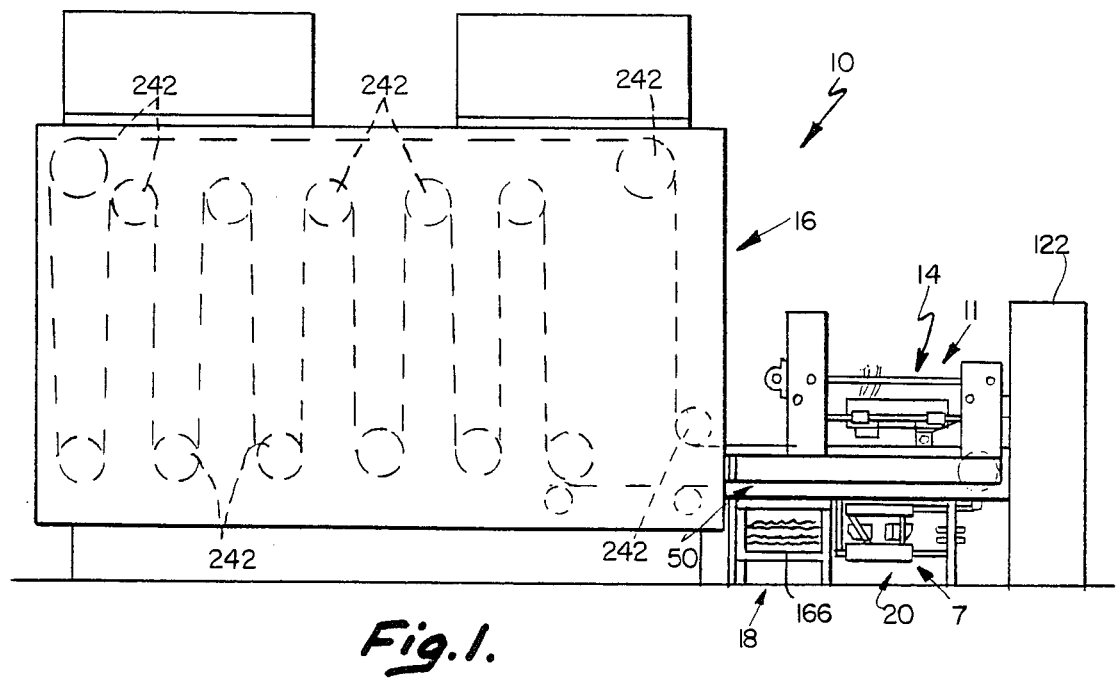
FIG. 1 is a front elevational view of an egg product cooking apparatus embodying the present invention.

The invention is preferably embodied in an apparatus and method for cooking egg product shown in a preferred form in FIG. 1 and referenced generally by the numeral 10. Apparatus 10 includes a series of processing stations through which a series of egg cooking molds 12 (FIG. 2) are conveyed. As shown in FIG. 1, the egg processing stations include an egg cracking and mold filling station 14, an egg product cooking station 16, a cooked egg product removal station 18 and a mold cleaning station 20. The series of molds 12 are continuously conveyed through these stations to automatically process the egg product.

Figure 2:
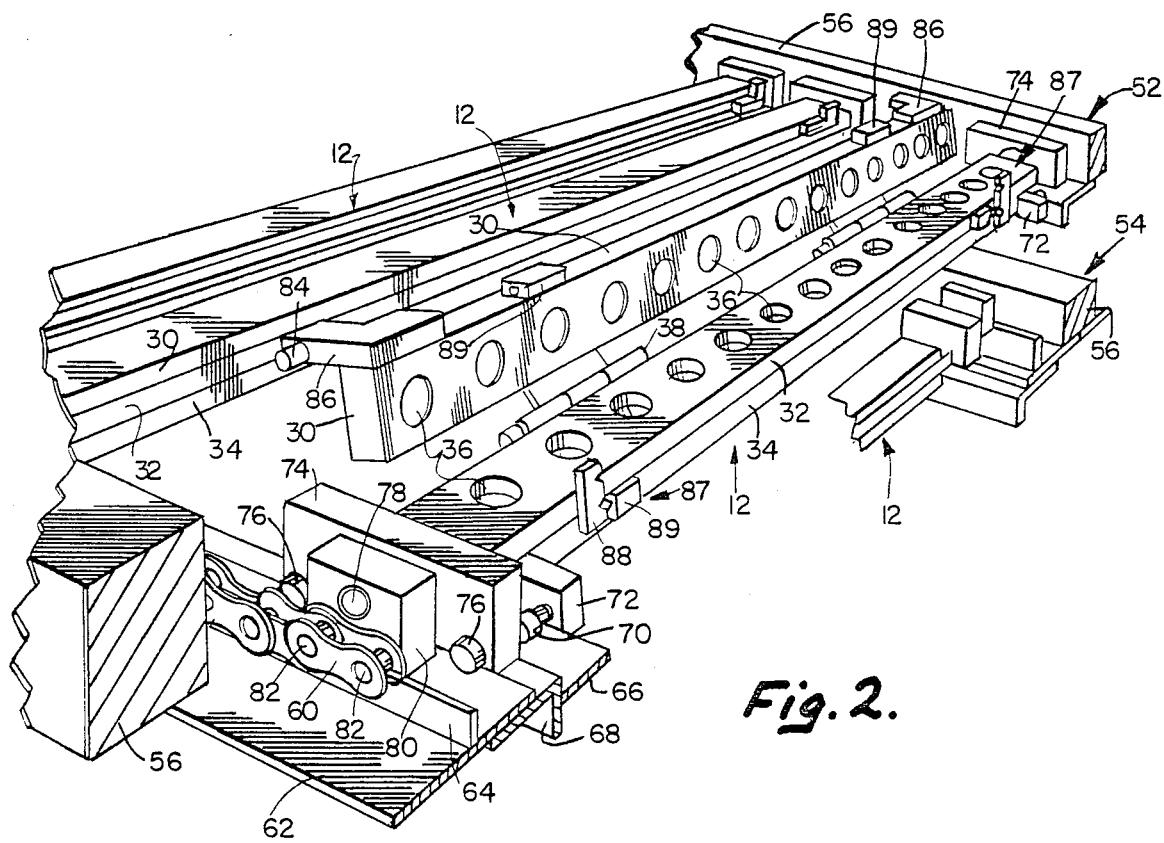
FIG. 2 is a fragmentary, perspective view of egg product cooking molds used in the apparatus of FIG. 1, with one mold shown in a partially open condition.

As shown in FIGS. 2, 4 and 5, each mold 12 is made up of three elongated bars that form an upper mold section 30, a middle mold section 32 and bottom mold section 34. Each mold 12 preferably contains fourteen mold cavities 36 (FIG. 2), each of which extends into or through all three mold sections 30-34. Alternatively, each mold 12 may have greater or lesser number of mold cavities, depending upon the length of mold 12 and the spacing of cavities 36. As shown in FIGS. 4 and 5, each mold cavity 36 is configured in a natural egg-shaped oval. The narrower or more pointed end of cavity 36 extends into bottom mold section 34 while the more rounded or blunt end of cavity 36 extends into upper mold section 3. Cavity 36 therefore opens through middle mold section 32.

Mold sections 30-34 are pivotally joined by a set of hinges 38. Each hinge 38 has three brackets that are each secured to one of mold sections 30-34, so that all three mold sections may be pivotally separated as shown in FIG. 5. Bottom mold section 34 and middle mold section 32 have abutting surfaces 40 (FIG. 5) that closely mate to form a smooth transition for mold cavities 36. Abutting surfaces 40 are located at the greatest diameter of mold cavities 36. This positioning of surfaces 40 produces a circular opening through abutting surfaces 40 that is as large as the largest generally horizontal diameter of the egg product formed within mold 12. This permits cooked egg product to be removed from mold 12 by separating middle mold section 32 and bottom mold 34 and permitting the cooked egg product to drop out of the mold cavities 36 at abutting surfaces 40.

Upper mold section 30 and middle mold section 32 have abutting surfaces 42 (FIG. 5) that closely mate to form a smooth transition for mold cavities 36 between mold sections 30 and 32. Abutting surfaces 42 are located at a position on mold cavities 36 above surfaces 40 so as to produce a smaller diameter circular opening that is still sufficiently large to permit the passage of a normal large grade egg yolk. With middle and bottom mold sections 32, 34 closed and upper mold section 30 open, a whole egg yolk may be dropped through the opening at abutting surfaces 42.

Although abutting surfaces 42 may be positioned at various heights along mold cavities 36, it is preferred that abutting surfaces 42 be positioned as high as possible on cavities 36 while still maintaining a circular opening of sufficient size to permit the passage of a natural egg yolk. The higher the location of abutting surfaces 42 on mold cavities 36, the greater the percentage of mold cavity 36 that will lie below abutting surfaces 42 and therefore the greater the amount of egg material that may be poured into mold cavities 36 prior to closing upper mold section 30. Abutting surfaces 40 are preferably located roughly at the mid-point of the mold cavities 36. Two narrow fill ports 44 (FIGS. 4, 5) open through the top of upper mold section 30. Fill ports 44 are used to top off mold cavities 36 as described below. Fill ports 44 are of sufficiently narrow diameter that fill ports 44 may remain open during cooking. Alternatively ports 44 may be closed by a suitable closure elements such as a sliding plate or the like (not shown) that operates in the manner of a gate valve. Molds 12 are either coated or made of stainless steel to conform to food preparation health requirements. Cavities 36 may alternatively be coated by a release agent, such as Teflon brand coating.

Molds 12 are conveyed between egg cracking and mold filling station 14, removal station 18 and cleaning station 20 along a frame 50 (FIG. 1). As shown in FIG. 2, molds 12 are joined together to form a conveyor-like assembly that is conveyed along an upper support 52 on frame 50 and a lower support 54. Both upper and lower supports 52, 54 include horizontal beams 56 that are secured to supporting legs and a base in conventional fashion. Molds 12 are joined together on either end by a link chain 60. Since the ends of each mold 12 are mirror images of each other, only one end of mold 12 and one end of upper and lower support 52 and 54 are hereinafter described. Upper support 52 and lower support 54 are similar with the exception of location and any specific differences hereinafter noted.

A guide plate 62 (FIG. 2) extends along the lower length of each horizontal beam 56 on upper supports 52 and is welded or otherwise suitably secured to beam 56. A metal tracking pad 64 extends along the upper surface of guide plate 62. Chain 60 seats on tracking pad 64 which causes chain 60 and hence molds 12 to track properly along the length of frame 50 as molds 12 are conveyed along machine 10. Another guide plate 66 projects inwardly beneath guide plate 62 and is spaced slightly below and inwardly of guide plate 62 by an "L" shaped spacing bar 68. Guide plate 66 provides a support surface for a cylindrical roller follower 70 that is mounted on bottom mold section 34. Roller follower 70 is mounted on bottom mold section 34 by a bracket 72 located immediately adjacent the end of bottom mold section 34. Roller follower 70 projects longitudinally past the end of bottom mold section 34 as shown in FIG. 6. Guide plate 66 maintains bottom mold section 34 in a closed condition as appropriate as mold 12 is transported through apparatus 10.

Middle mold section 32 is bolted or otherwise secured to a pivot block 74 (FIGS. 2, 6). Projecting longitudinally outwardly from pivot block 74 opposite middle mold section 32 are a spaced pair of cylindrical roller followers 76. Roller followers 76 are supported and roll along the upper surface of guide plate 62. Pivot block 74 is pivotally coupled by a pivot 78 to a mounting block 80. Pivot 78 is a self lubricating brass bushing or other suitable pivot that permits mounting block 80 and pivot block 74 to pivot freely relative to one another. Mounting block 80 is secured to chain 60 by two spaced link rods 8 (FIG. 2). Link rods 82 are posts protruding inwardly to one side of chain 60, which posts are received and secured in apertures in mounting block 80.

As chain 60 conveys mold 12 from lower support 54 up to and along upper support 52, chain 60 and mounting block 80 become inverted relative to mold 12. Pivot 78 permits pivot block 74 and hence mold 12 to remain in an upright orientation during this inversion. As shown in FIG. 2 and the upper region of FIG. 3, mold 12 is being conveyed along upper support 52 and therefore mounting block 80 is positioned side by side with pivot block 74. Tracking pad 64 is relatively short in order to accommodate this positioning of mounting block 80. As shown in FIG. 6 and the lower region of FIG. 3, mold 12 is being conveyed along lower support 54. Mounting block 80 therefore overlaps but projects upwardly from pivot block 74. Tracking pad 64 therefore has a greater height along lower support 54 in order to accommodate this orientation of mounting block 80.

As shown in FIG. 2, a roller follower 84 is mounted on the end of upper mold section 30 by a mounting bracket 86. Roller follower 84 projects longitudinally past the end of upper mold section 30 to a location directly above roller follower 70 (FIG. 6). Roller follower 84 is brought into contact with camming surfaces at various locations within apparatus 10 in order to either hold upper mold section 30 in a closed condition or to open upper mold section as hereinafter described. As shown in FIG. 6, both upper mold section 30 and bottom mold section 34 are shorter than middle mold section 32. This provides clearance between roller followers 70 and 84 and pivot block 74. Camming surfaces may therefore access roller followers 70 and 84 without interference from pivot block 74.

Secured adjacent to each end of mold 12 is a latching assembly 87 (FIGS. 2, 6). Each latch assembly 87 includes a notched plate 88 connected to middle mold section 32. Notched plate 88 projects above and depends below middle mold section 32 so that the notches lie adjacent to upper mold section 30 and bottom mold section 34. A spring loaded detent post 89 is mounted on each of mold sections 30 and 34 in order to engage the notches of notched plate 88. Spring loaded detent posts 89 hold mold sections 30 and 34 closed until a sufficient opening force is provided to overcome the detent spring force.

Shown in FIG. 11 is egg breaking and mold filling station 14. Egg breaking and mold filling station 14 is located at the upstream end of upper support 52. An end cog 100 is located at the end of frame 50 in order to raise molds 12 from lower support 54 up to upper support 52.

At mold filling station 14 (FIG. 11) are an aligned row of fourteen mold filling valves 102 (FIG. 13), which are used to initially introduce an egg yolk and egg white material into mold cavities 36 of open molds 12. The filling valves 102 are mounted on a carriage plate 104 that extends the width of apparatus 10. Each filling valve 102 is a rectangular downspout-like housing having a recessed lower surface 106 (FIG. 120). Lower surfaces 106 seat on abutting surface 42 of middle mold section 32 when mold 12 is an open condition in order to maintain alignment of seated valves 102 and mold 12 during filling. A ramped trough 108 funnels into the upper end of each filling valve 102. Ramped trough 108 opens downwardly into a fill port 110 (FIG. 12) that opens downwardly through filling valve 102. A single common valve stem 112 (FIG. 13) extends through all filling valves 102 Valve stem 112 includes valve openings therethrough (not shown) that when aligned with fill ports 110 permit the passage of egg materials through filling valves 102. On the protruding ends of valve stem 112 are pinion gears 114 (FIG. 12). Pinion gears 114 are used in a rack and pinion actuator assembly for the operation of filling valves 102. A rack 116 (FIG. 11) engages each pinion 112. Rack 116 is reciprocated by a pneumatic cylinder 118. Alternatively, pneumatic cylinder 118 could be hydraulic or a mechanical actuator. Pneumatic cylinder 118 is mounted on a side bracket 120. Side bracket 120 is in turn welded on carriage plate 104 for movement therewith.

An egg breaking machine 122 (FIG. 1) is located adjacent the end of frame 50. Egg breaking machine 122 shells natural eggs and ejects the egg white and egg yolk materials through an outlet trough 124 (FIG. 13). Outlet trough 124 has a fluted lower surface that funnels the egg contents out over troughs 108 on filling valves 102. Fill troughs 108 have an elongated upper opening so as to be located beneath outlet trough 124 even though filling valves 102 are moved laterally relative to egg cracking machine 122. One suitable egg breaking machine is manufactured by Seymour Foods Incorporated, P.O. Box 1220, Topeka, Kan. 66601, and marketed under the trade name of Seymour Egg Breaker-Separator System, Model 104-B. Other suitable egg cracking machines or methods may be used in order to supply egg white material and egg yolks at mold filling station 14.

A trailing carriage plate 128 (FIG. 11) is connected to side brackets 120 downstream of carriage plate 104. A topping-off valve assembly 130 is mounted beneath carriage plate 128. Topping-off valve assembly 130 includes a set of fill brackets 132 that depend to a seating block 134. Seating block 134 seats flush on top of upper mold section 30 when mold 12 is in a closed condition. Topping off lines 136 extend out of seating block 134. Topping lines are connected to an egg white material supply with a conventional pump assembly (not shown) in order to inject egg white material through openings in seating block 134 and fill ports 44 of upper mold section 30. Seating block 134 may also alternatively include a level sensor probe (not shown) that depends from seating block 134 to be inserted down through a fill port 44 in order to determine when mold cavity 36 has been filled to a preselected fill level.

Shown in FIG. 14 is a topping off valve 138 used in topping-off valve assembly 130. Topping off valve 138 includes a valve body 140 having a series of inlet ports 142 that open into a series of spherical holding cavities 144. A series of outlets 146 open out of holding cavities 144. A common valve stem 148 extends through all mold cavities 144. Valve stem 148 has enlarged regions that selectively block valve inlets 142 and valve outlets 146. A pneumatic cylinder 150 is connected to valve stem 148 in order to linearly reciprocate valve stem 148. An egg white supply is pumped to supply egg white through inlets 142 to holding cavities 144 while valve stem 148 is shifted to an inlet condition with valve inlets 142 opened and valve outlets 146 closed off. When valve stem 148 is linearly shifted, the enlarged regions of stem 148 close off valve inlets 142 are and open outlets 146. Egg white contained within valve cavities 144 is thus permitted to flow out through outlets 146 through fill lines 136 into egg cavities 36. Topping-off valve 138 is utilized when a preselected volume of egg white is to be added to mold cavities 36. Other alternative topping-off valve assemblies may be utilized, such as when a level sensor probe is used to control the filling of egg cavities 36.

Carriage plates 104 and 128 with side brackets 118 form a rigid carriage assembly that is used to shift filling valves 102 and topping off valve assembly 130 along with molds 12 at mold filling station 14. Filling valves 102 and topping off valve assembly 130 are seated on top of separate molds at 12 and shifted laterally as molds 12 are conveyed during the filling operation. Thereafter, the overall carriage assembly is raised and returned back to its starting position for seating on another set of molds 12 for filling.

Figure 15:
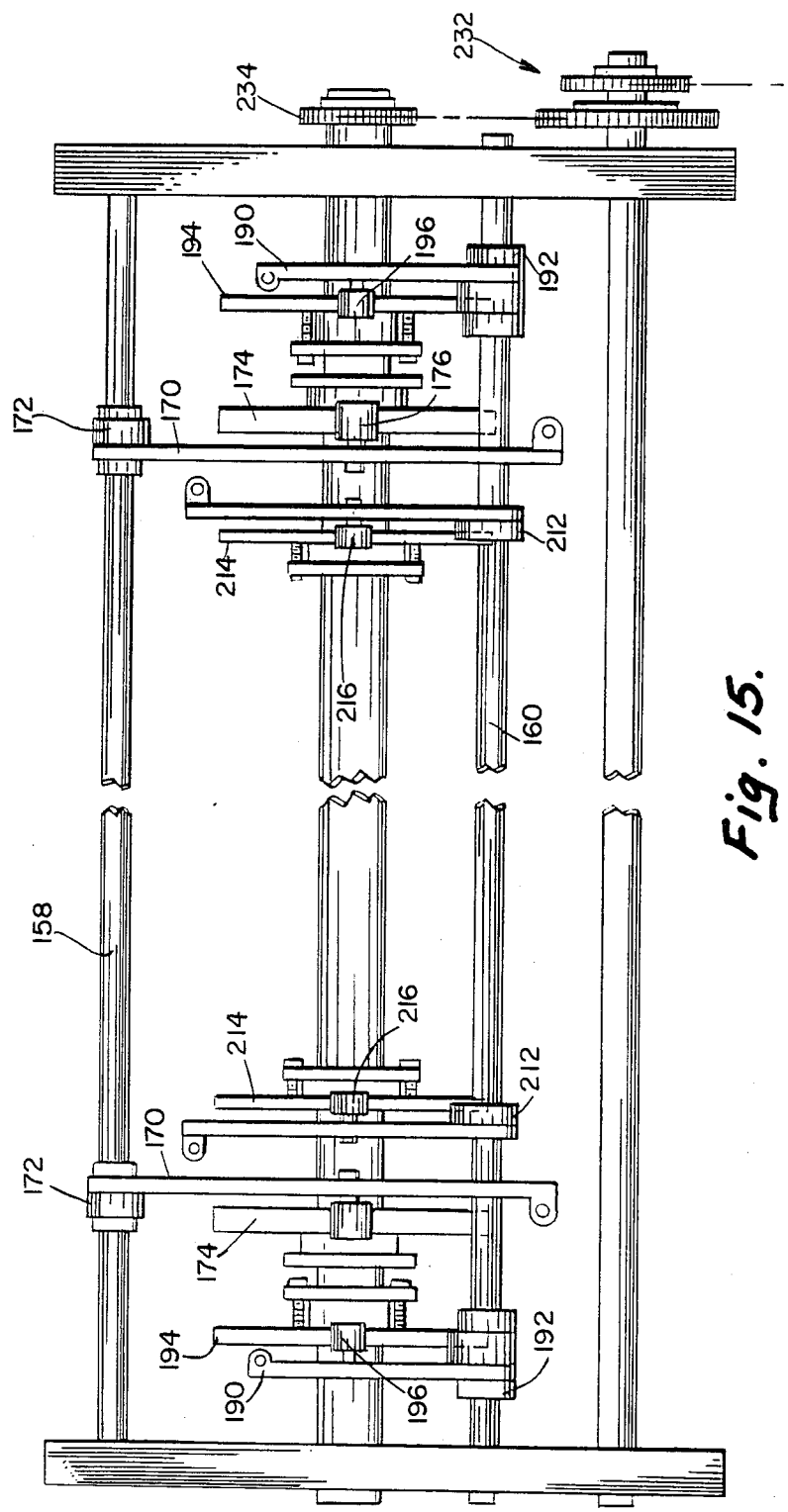
FIG. 15 is a fragmentary end elevational view of the cam and lever shifting assembly used with the mold filling station, taken in the region of arrow XV in FIG. 11.

The assembly used to shift the mold filling valve assembly along with the conveying of molds 12 uses a cam arrangement (FIGS. 11, 15, 16) to open molds 12, and to raise and lower as well as laterally shift the valves. As shown in FIG. 11, a lateral guide rod 140 is mounted on either end of carriage plates 104, 128. A pair of bearings 142 coupled to carriage plates 104, 128 slidably receive each lateral guide rod 140 so that the mold filling valve assembly may slide laterally freely along guide rods 140. A pair of vertical guide rods 144 are mounted on each upper horizontal beam 56. Vertical guide rods 144 are spaced in order to accommodate lateral guide rods 140 therebetween. A sliding bearing 146 is connected to each end of lateral guide rods 140 and each receive a vertical guide rod 144. Bearings 146 permit lateral guide rods 140 to be raised and lowered freely along vertical guide rods 144.

Figure 16:
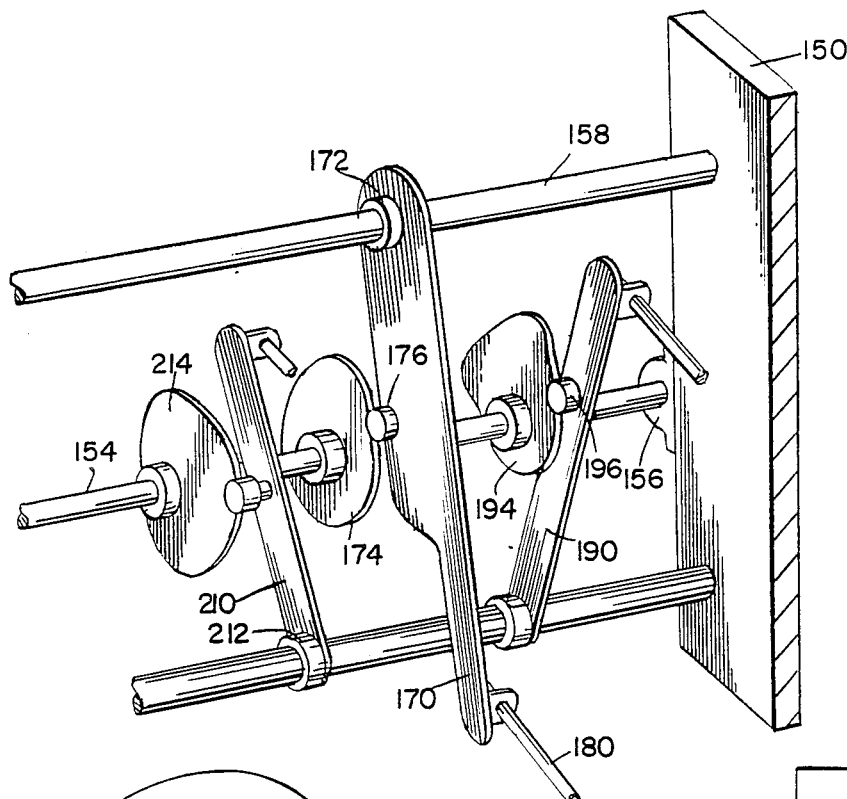
FIG. 16 is a fragmentary perspective view of one end of the cam and lever shifting assembly of FIG. 15.

Located toward the downstream end of egg cracking and mold filling station 14 are a pair of mounting panels 150 (FIG. 11) welded to the sides of horizontal beams 56. Mounted on the upstream end of mold filling station 14 are a pair of a shorter mounting panels 152. As shown in FIG. 16, a drive axle 154 is mounted by pillow blocks 156 on mounting panels 150. A fixed upper axle 158 is secured between mounting panels 150. Upper axle 158 is spaced above and to the upstream side of drive axle 154. A fixed lower axle 160 is mounted between mounting panels 150 directly beneath upper axle 158 and spaced below drive axle 154.

Shown in FIG. 16 is one side of the cam assembly used to shift the mold filling valve assembly. Since the two sides of the cam assembly are mirror images of each other (FIG. 15), only one side is described below. A lateral shift lever 170 is used to laterally reciprocated the mold filling valve assembly with the conveying of molds 12. Lateral shift lever 170 is pivotally mounted by a bearing 172 to upper axle 158. A lateral shift cam 174 is keyed or otherwise suitably mounted on drive axle 154 in order to rotate therewith. A roller follower 176 on lateral shift lever 170 contacts cam 174 in order to move lever 170 with the rotation of cam 174. Lateral shift lever 170 includes a notched lower region 178 (FIG. 16) that provides clearance about lower axle 160, and lateral shift lever 170 depends beneath lower axle 160. An adjustable length linkage 180 (FIG. 11) couples the lower end of lateral shift lever 170 to side bracket 120. Thus, as lateral shift cam 174 rotates, side brackets 120 are slid laterally along guide rods 140.

A vertical shift lever 190 (FIG. 16) is used to raise and lower the mold filling valve assembly onto molds 12. Vertical shift lever 90 is coupled by a bearing 192 to lower axle 160. A vertical shift cam 194 is keyed or otherwise suitably coupled to drive axle 154 in order to rotate therewith. A roller follower 196 on vertical shift lever 190 contacts cam 194. Vertical shift lever 190 therefore pivots with the rotation of vertical shift cam 194. A roughly triangular vertical shift bracket 198 (FIG. 11) is mounted on each of mounting panels 150 and 152. Each bracket 198 is mounted by appropriate bearings on a short mounting axle 200 at one corner of bracket 198. Vertical shift brackets 198 are linked together at their upper corners by a tie rod 202. The downstream vertical shift bracket 198 is linked to the upper end of vertical shift lever 190 by an adjustable length linkage 204. The pivoting of lever 190 therefore simultaneously pivots both vertical shift brackets 198. The lower corner of each vertical shift bracket 198 is coupled to one of sliding bearings 146 by a linkage 206 having an adjustable length. So linked, lateral guide rod 140 raise and lower along vertical guide rods 144 as vertical shift brackets 198 are pivoted.

A mold opening lever 210 (FIG. 16) is pivotally mounted by a bearing 212 to lower axle 160. A mold opening cam 214 is keyed or otherwise suitably coupled to drive axle 154 for rotation therewith. A roller follower 216 on mold opening lever 210 contacts and tracks mold opening cam 214. A kicker lever 218 (FIG. 11) through a suitable bearing is pivotally mounted on mounting panel 152 by a cantilevered cam lever axle 220 (FIG. 13). Kicker lever 218 extends upwardly above axle 220 as well as depending down to the mold conveying region about end cog 100. The lower end of kicker lever 218 is angled into a contact surface 222. Contact surface 222 is sloped and positioned in order to contact roller follower 84 on upper mold sections 30 when lever 218 is pivoted. A tie rod 222 (FIG. 11) couples the upper end of mold opening lever 210 with the upper end of kicker lever 218. In operation, as mold opening lever 210 is shifted by cam 214, kicker lever 218 pivots to contact roller follower 84 and kick open upper mold section 30 as mold 12 enters mold filling station 14. A cam closing surface 224 (FIG. 11) is mounted between filling valves 102 and topping off valve assembly 130 on horizontal beam 56. Cam closing surface 224 is located so a to contact roller follower 84 of opened upper mold section 30 in order to force upper mold section 30 closed as mold 12 travels in the direction of arrow A prior to reaching topping off valve assembly 130.

Figure 18:
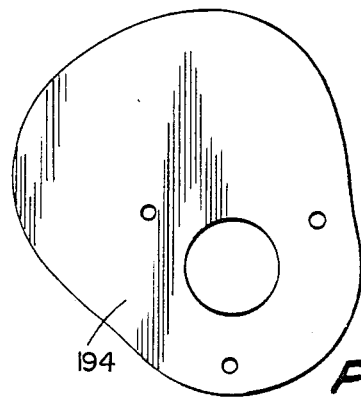
FIG. 18 is a front elevational view of a vertical shift cam used in the cam and lever shifting assembly of FIG. 15.
Figure 20:
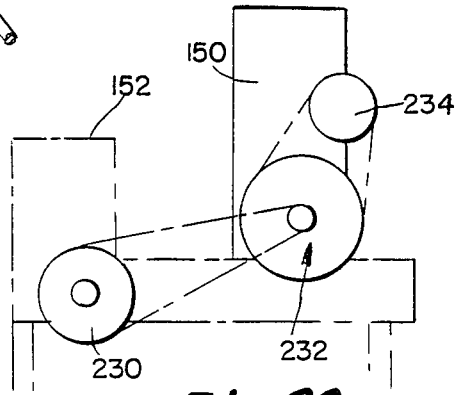
FIG. 20 is a schematic rear view of the drive linkage for the cam and lever shifting assembly of FIG. 15.
Figure 17:
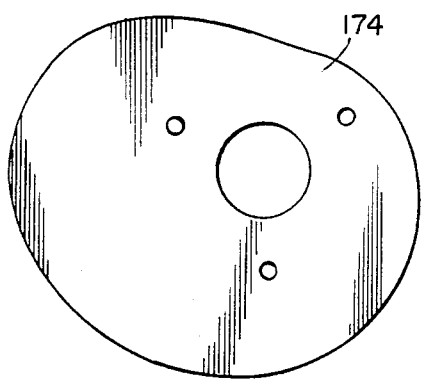
FIG. 17 is a front elevational view of a lateral shift cam used in the cam and level shifting assembly of FIG. 15.
Figure 19:
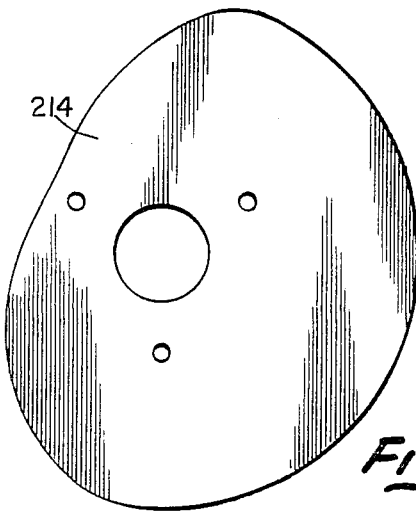
FIG. 19 is a front elevational view of a mold opening cam used in the cam and lever shifting assembly of FIG. 15.

A preferred configuration for lateral shift cam 174 is shown in FIG. 18, while a preferred configuration for vertical shift cam 194 is shown in FIG. 17 and a preferred configuration for mold opening cam 214 is shown in FIG. 19. Shown schematically in FIG. 20, a drive gear 230 is coupled to a suitable drive motor (not shown) used to drive both drive gear 230 and end cog 100. Drive gear 230 is coupled through a set of reducer gears 232 to gear 234 on drive axle 154. Cams 174, 194 and 214 are suitably clamped or otherwise coupled to appropriate mounting blocks or the like keyed onto drive axle 154.

Cams 174, 194 and 214 are configured so that as mold 12 enters mold filling station 14, mold opening lever 210 is shifted, causing kicker lever 218 to kick open upper mold section 30. Side brackets 120 are laterally shifted along lateral guide rods 140 to an upstream position. Vertical shift lever 190 is pivoted by vertical shift cam 194, causing vertical shift brackets 198 to lower lateral guide rods 140 along vertical guide rods 144. Mold filling valves 102 are thereby lowered down onto an open mold 12 while topping-off valve assembly 130 is lowered onto a closed mold 12 further downstream. As end cog 100 turns lateral shift cam 174 pivots lateral shift lever 170 in order to shift side brackets 120 simultaneously with the conveying of molds 12. During this shifting procedure, egg materials are introduced into open mold 12 through valves 102 and egg white material is injected to top off closed mold 12 through topping-off valve assembly 130. Thereafter vertical shift cam 184 pivots vertical shift lever 190 in order to raise lateral guide rod 140, followed by lateral shift lever 170 returning side brackets 120 along rods 140 to a starting position for lowering onto a new set of molds 12.

Cooking station 16 includes an oven 240 through which filled molds 12 are conveyed for cooking. Oven 240 includes a series of direction changing cogs or gears 242 that produce a serpentine or zigzag path for molds 12 through oven 240. Each mold 12 is thus raised and lowered along this serpentine path while the pivoting connection to chains 60 maintain molds 12 in an upright orientation. After passing through the vertical serpentine path molds 12 are conveyed along the bottom of oven 240 back to egg product removal station 18.

Oven 240 is maintained at a preferred temperature ranging around one hundred eighty degrees Fahrenheit to one hundred eighty-five degrees Fahrenheit. Egg product conveyed through oven 240 is therefore cooked at a temperature lower than the normal boiling point of water. This cooking temperature preferably has a maximum preferred temperature level in the vicinity of about one hundred eighty-five degrees Fahrenheit to one hundred eighty-seven degrees Fahrenheit. The egg product is cooked in oven 240 for a time period ranging preferably between about twenty-five to thirty minutes. The speed that molds 12 are conveyed through oven 240 as well as the number and spacing of cogs 240 may be adjusted in order to accommodate this cooking time period, the egg product being preferably cooked for a much longer time period than for normal hard boiled eggs. When a freshly laid egg is cooked at this low temperature and longer time period, a cooked egg product having a smooth outer surface is produced. It is believed that when freshly laid eggs are cooked at temperatures in excess of the preferred maximum temperature pock marking will result on the surface of the egg. With the preferred cooking time and temperature it is most preferred that a freshly laid egg be used. Alternatively however eggs having been laid several hours or days previously may also be satisfactorily utilized in the cooking method.

Figure 9:
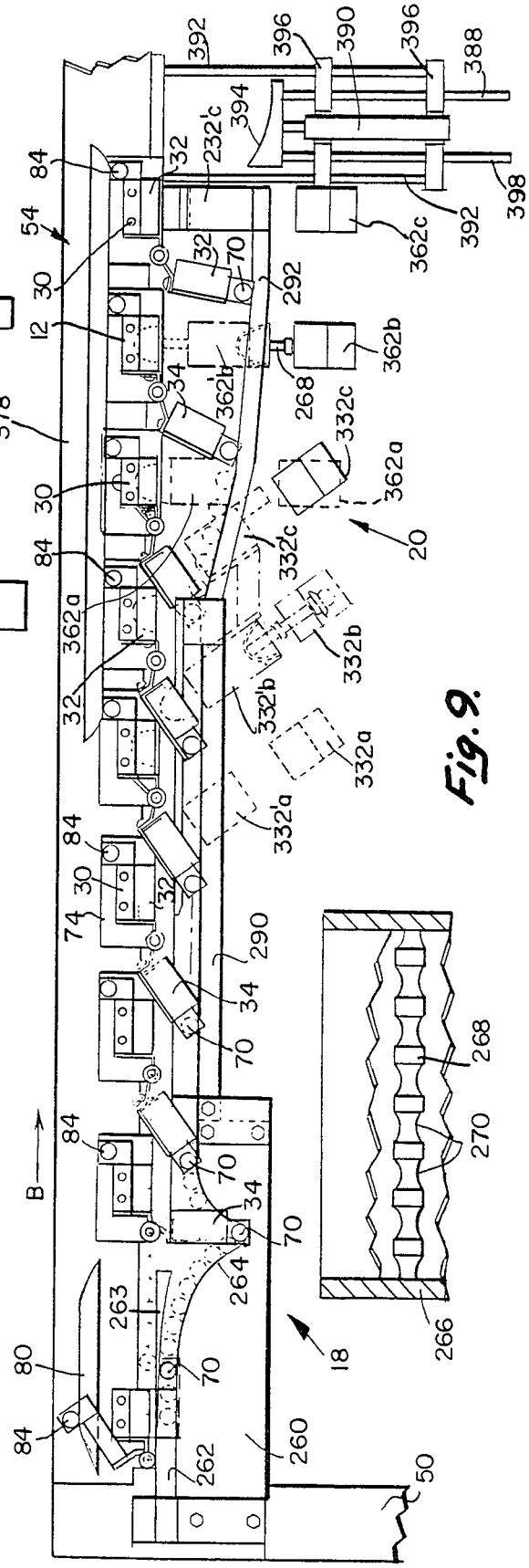
FIG. 9 is a fragmentary, front schematic view of a linked series of egg product cooking molds being conveyed through the cooked egg product removal station and cleaning station of the apparatus shown in FIG. 1.

Egg product removal station 18 is shown in FIG. 9 and includes a camming plate 260 mounted beneath each lower support 54. Camming plate 260 has a camming surface 262 that provides a guide track for roller follower 70 o bottom mold section 34. Camming surface 262 extends under an unlatching cam surface 263 located near the entrance to removal station 18. Unlatching cam surface 263 contacts the upper edge of roller follower 70 in order to force follower 70 downwardly and unlatch latching assembly 87. Camming surface 262 curves downwardly to a trough region 264 that causes bottom mold section 34 to drop open. Trough region 264 has a smoothly curved, generally V-shaped configuration that causes bottom mold section 34 to pivot downwardly and then pivotly invert as mold 12 advances in the direction of arrow B in FIG. 9.

A chill bath 266 is located beneath trough region 264 and extends the width of apparatus 10. Chill bath 266 is positioned so that cooked egg product in mold 12 will drop out of mold cavities 36 and fall into chilled water or other suitable cooling solution in bath 266 as bottom mold section 34 is pivotedly lowered. Located in bath 266 are a series of conveyor rollers 268 that form a roller conveyor. Conveyor rollers 268 are scalloped into smoothly reduced diameter regions spaced along their length in order to provide curve recesses 270. Curved recesses 270 cradle the cooked egg product as the egg product is rolled along conveyor rollers 268 and thereby reduce damage to the exterior surface of the cooked egg product. A suitable roller conveyor drive (not shown) turns rollers 268 to convey the cooked egg product.

An upper camming surface 280 (FIG. 9) is located above camming surface 262 and unlatching cam surface 263. Upper camming surface 280 is located just prior to the start of trough region 264. Upper camming surface 280 is located so as to contact roller follower 84 on upper mold section 30 and thereby raise open upper mold section 30. Upper camming surface 280 cracks open upper mold section 30 in order to release the vacuum within mold cavities 36, thus permitting the cooked egg product to drop freely out of mold 12 as bottom mold section 34 is pivoted downwardly.

A beam 290 extends from camming plate 260 in order to form a continuation of camming surface 262 that leads into mold cleaning station 20. Beam 290 is positioned in order to hold bottom mold section 24 in a sloped semi-inverted orientation shown in FIG. 9. Beam 290 extends into a lowered beam section 292. Lowered beam section 292 ramps downwardly in order to cause bottom mold sections 34 to drop downwardly toward a vertical orientation at the end of mold cleaning station 20.

The mold cleaning apparatus is shown in FIGS. 7 and 8. A vertically spaced pair of horizontal support rods are mounted on either side of apparatus 10 to extend between vertical legs of frame 50. A generally horizontal carriage bar 302 is mounted on each support rod 300 by a pair of sliding bearings 304 (FIG. 8). An angled guide rod 306 is secured between upper and lower carriage bars 302, and a vertical guide rod 308 is also secured between upper and lower carriage bars 302 downstream of angled guide rod 306. Carriage bars 302 as joined by angled guide rod 306 and vertical guide rod 308 form a rigid carriage on each side of apparatus 10 that slides along support rods 300. A pneumatic cylinder 310 coupled to lower carriage bar 302 laterally reciprocates carriage bars 302 and guide bars 306, 308 along support rods 300. Cylinder 310 advances the cleaning assembly along with the conveying of molds 12 during the cleaning operation.

On each end of apparatus 10 a mounting plate 320 (FIGS. 7, 8) is slidably mounted on angled guide rod 306 by a pair of bearings 322. Beams 323 (FIG. 7) extend the width of apparatus 10 to join mounting plates 320 and form a rigid carriage that slides along angled guide rods 306. This rigid carriage is used to advance and retract cleaning utensils relative to open molds 12. A suitable cleaning drive motor 324 is mounted on mounting plate 320 on side of apparatus 10. A pair of cleaning drive gears 326 and a pinion gear 328 are mounted on mounting plate 320 in order to be driven by motor 324 through a drive chain 330 (FIG. 8). Extending substantially the width of apparatus 10 between mounting plates 320 are a laterally spaced pair of angled rectangular brush housings 332. A brushed drive axle 334 is connected to each drive gear 326 to extend within housings 332. Suitable bearings on axles 334 allow axles 334 to be driven by motor 324. Spaced along each axle 334 are sloped gears 336. Sloped gears 336 provide right angle transmission to a series of brush drive shafts 338. Brush drive shafts 338 are mounted by suitable bearings 340 and protrude out of housings 332. Drive shafts 338 are aligned with cavities 36 of an adjacent mold 12, so that fourteen drive shafts 338 are carried on each axle 334. A brush head 342 is located on the end of each drive shaft 338. Brushes 342 each have a curved surface that mates with an egg cavity 36 for insertion during cleaning of mold cavities 36. A pneumatic cylinder 344 coupled between each mounting plate 320 and lower carriage bar 302 reciprocates the cleaning assembly on mounting plate 320 in order to advance brushes 342 into the bottom mold sections of two adjacent open molds 12.

A mounting plate 350 is mounted by a pair of sliding bearings 352 on each vertical guide rod 308. Reinforcing beams 353 extend between the two mounting plates 352 in order to form a rigid assembly. A suitable cleaning drive motor 354 is mounted on one mounting plate (FIG. 7) along with a pair of brush drive gears 356 and pinion gear 358. Motor 354 drives brush drive gears 356 through a drive chain 360.

Extending between mounting plates 350 are a pair of brush housings 362 (FIG. 7). Extending within housings 362 are a pair of brush drive axles 364 which are coupled to brush drive gears 356. Spaced along drive axles 364 are sloped gears 366 that turn a spaced set of brush drive shafts 368. Brush drive shafts 368 are mounted by bearings 370 on housings 362 in order to freely rotate, and each drive shaft 268 includes a brush head 372 at its upper end. Brushes 372 are shaped to be matingly inserted into cavities 36 of an adjacent mold 12. A pneumatic cylinder 374 couples mounting plate 350 to lower carriage bars 302. Cylinder 374 raises and lowers brushes 372 into and out of upper mold sections 30 and middle mold sections 32 of an adjacent mold 12 when bottom mold section 34 is in an open condition.

As shown in FIG. 9, a top closing cam surface 378 extends along the upper edge of cleaning station 20. Cam surface 378 is positioned to contact roller followers 84 on upper mold sections 30 in order to hold upper mold sections 30 closed during cleaning.

As a cleaning cycle is commenced, cylinder 310 draws the cleaning assembly toward the downstream end of cleaning station 20. Housings 332 are thus positioned at locations 332A and 332B of FIG. 9. As the cleaning cycle commences cylinder 344 raises mounting plates 320 along angled guide rods 306 in order to advance housings 332 to positions 332A' and 332B'. At these raised positions brushes 342 have been inserted into cavities 36 on two adjacent molds 12. A steam jet (not shown) located adjacent to each brush 342 sprays into cavity 36 on lower mold section 34 as brushes 342 are turned. Simultaneously cylinders 374 raise mounting plates 350 so that housings 362 are shifted from positions 362A and 362B to raised positions 362A' and 362B'. In these raised positions, brushes 372 are inserted into cavities 36 of upper mold section 30 and middle mold section 32. Steam jets (not shown) positioned adjacent each brush 372 spray cavities 36 as brushes 372 are turned. While brushes 342 and 372 are turning to clean cavities 36, cylinder 310 advances the cleaning assembly simultaneously with the advancement of molds 12. When the cleaning process has been completed, housings 332 have been shifted to positions 332B' and 332C', while housings 362 have been shifted to positions 362B' and 362C' (FIG. 9). Cylinders 344 and 374 there retract or lower mounting plates 320 and 350 away from molds 12. Cylinder 310 then returns the cleaning assembly to the starting position for another cycle.

Since each axle 338 and 368 are provided with a cavity cleaning brush, two adjacent lower mold sections 34 are simultaneously cleaned and thereafter these adjacent molds 12 are advanced for the simultaneous cleaning of upper and middle mold sections 30, 32. Alternatively, the forward set of cleaning drive shafts 338 on mounting plate 320 and the forward set of cleaning drive shafts 368 on mounting plates 350 may be fitted with semi-resilient rubber or plastic scraping utensil heads. In this scraping embodiment, each set of drive shafts must access every mold in order to first scrape and then brush mold cavities 36.

A mold closing cylinder 390 is mounted at the end of mold cleaning station 20 (FIG. 9). Mold closing cylinder 290 is mounted by a pair of mounting rods 392 to lower support 54. Mold closing cylinder 390 raises and lowers a curved closing surface 394. Curved closing surface 394 is positioned to contact roller follower 70 on bottom mold section 34 after follower 70 has been conveyed off of lower beam section 392. Cylinder 290 is secured to a pair of mounting plates 396 that extend between mounting rods 392. A pair of guide rods 398 depend from closing surface 394 and slidably extend through appropriate bearings in mounting plates 396. As mold 12 is conveyed over cylinder 390, closing surface 394 is raised in order to contact follower 70 and pivot bottom mold section 34 until latch assembly 87 closes.

Figure 3:
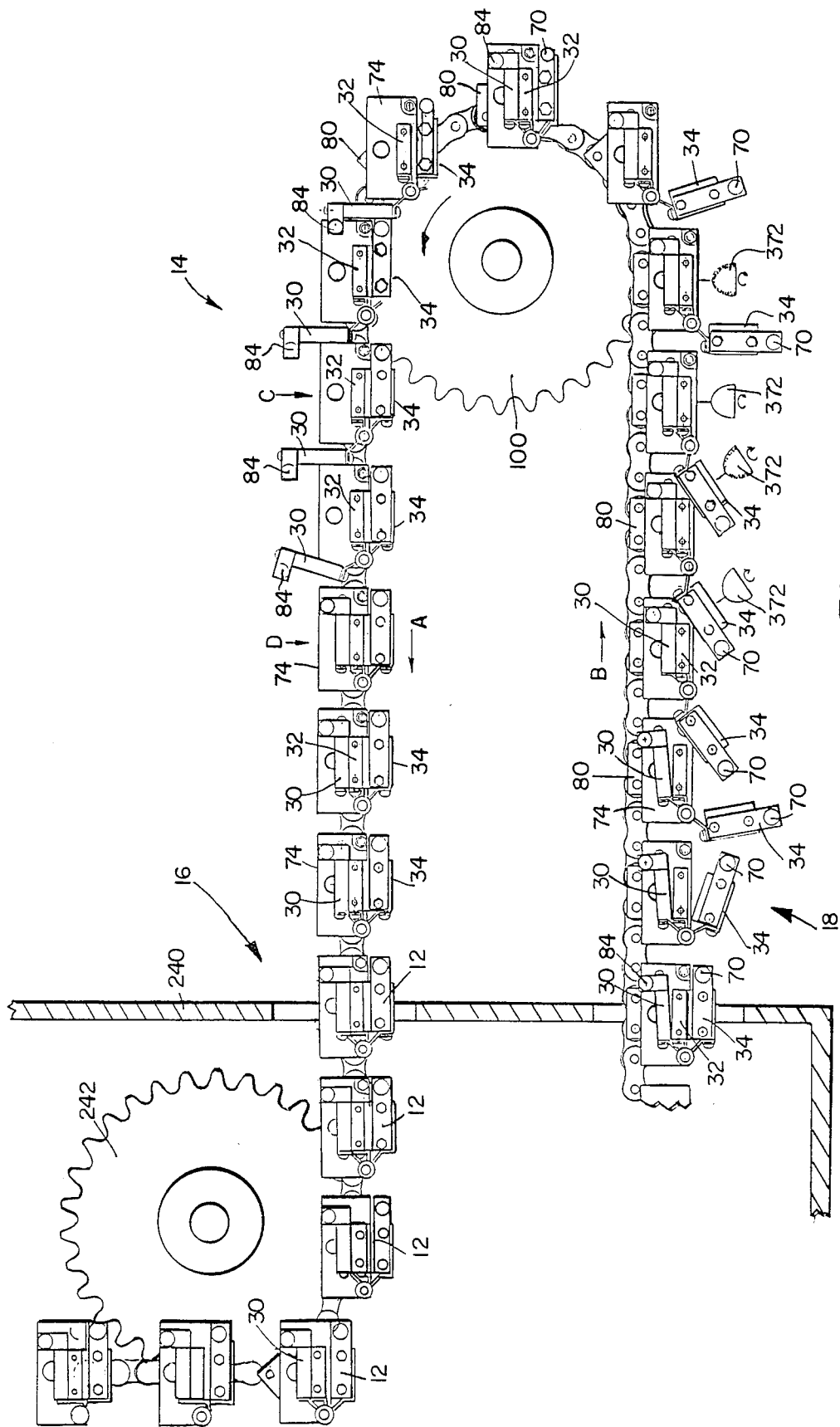
FIG. 3 is a schematic front view of a linked series of egg product cooking molds being conveyed through various processing stations of the apparatus shown in FIG. 1.

The manner in which molds 12 are conveyed through apparatus 10 is shown in FIG. 3. As shown in FIG. 3, molds 12 are conveyed through filling station 14. As shown in the upper right region of the figure, as mold 12 passes over end cog 100, bottom mold section 34 is closed while upper mold section 30 is opened by kicker 218. In the region of arrow C, an egg yolk and egg white are poured into middle and bottom mold sections 32, 34. Upper mold section 30 is then closed by cam closing surface 224. In the region of the arrow D egg white is injected through ports 44 in order to top off the mold cavities 36. Molds 12 continue to be conveyed in the direction of arrow A into oven 240 for cooking. As molds 12 exit oven 240, upper mold section 30 is cracked open slightly by upper camming surface 280 and bottom mold section 34 is slowly dropped and substantially inverted in order to dump the cooked egg product. Molds 12 continue to be conveyed in the direction of arrow B into cleaning station 20, whereat brushes 342 and 372 clean bottom mold section 34 and closed upper and middle mold sections 30, 32, respectively. Molds 12 are then conveyed up around end cog 100.

A suitable set of controls of conventional design sequentially activate the cleaning apparatus and mold filling apparatus as well as control the speed that molds 12 are conveyed through cooking station 16.

With the disclosed cooking method, the cholesterol level of the cooked egg product may be changed while still producing an egg product having the volume of that of a normal large grade egg. To vary the cholesterol, either a small or medium grade egg white and egg yolk are deposited into a mold cavity 36. Additional egg white is injected into the enclosed mold cavity until the volume of a natural large grade egg is reached. The reduction in size of the egg yolk relative to the volume of egg white thus varies the cholesterol level as required. By reducing the size of the yolk the cholesterol level of a large grade egg may be reduced by approximately one third.

Preservatives may also be mixed with the egg white or egg yolk preparatory to cooking. Preservative agents of various suitable types may be used which permit the cooked egg product to be frozen for storage and transport. Other ingredients may also be mixed in with the egg white, egg yolk or both as desired.

Figure 10:
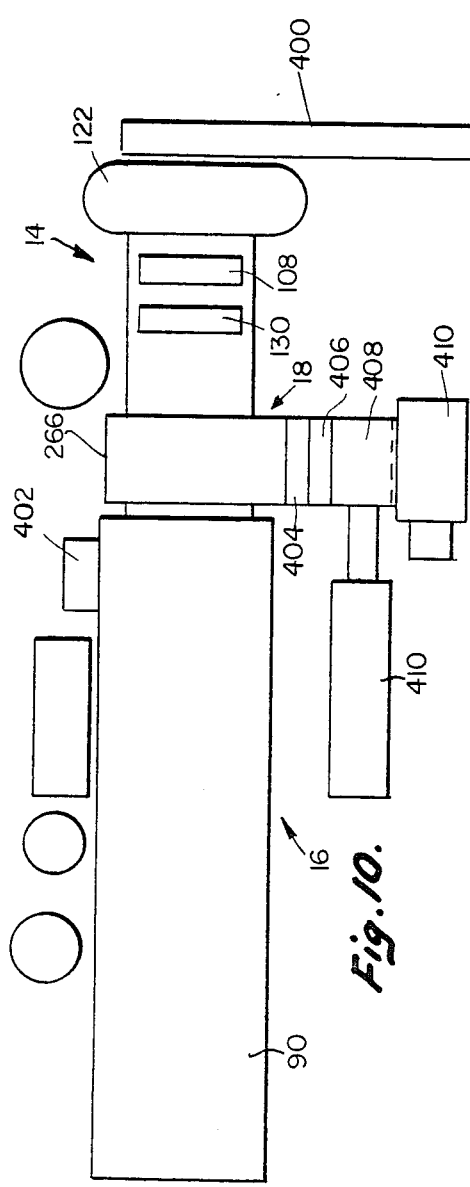
FIG. 10 is a top plan view of the apparatus shown in FIG. 1 in conjunction with additional handling equipment.

As shown in FIG. 10, a conveyor 400 transports eggs to egg cracking machine 122. Egg yolks and egg white are dumped into molds at valve troughs 108 while molds are topped off with egg white at topping off valve assembly 130. Thereafter molds 12 are conveyed through oven 240 by motor drive 402 coupled to cogs 242. When the cooked egg product is dumped into chill bath 266, the egg product is passed through an inspection region 404 where the egg product is visually inspected for flaws. The cooked egg product is then transferred into a wash station 406 and thereafter to a drying and ultraviolet treatment region 408 along a conveyor. The egg product is then conveyed to various loading machines 410 that package the cooked egg products in egg cartons for stacking and transport.

It is to be understood that the above is a description of the preferred embodiments and one skilled in the art will recognize that various modifications or improvements may be made without departing from the spirit of the invention disclosed herein. The scope of protection is to be determined by the claims which follow and the breadth of interpretation that the law allows.

The embodiment of the invention in which an exclusive property or privilege is claimed are defined as follows:

1. An apparatus for cooking egg products comprising:
a selectively openable and closable mold having at least one substantially whole egg-shaped mold cavity;
means for introducing egg yolk material into said mold cavity;
means for filling said mold cavity with egg white material;
means for heating said mold;
means for opening said mold and removing cooked egg product from said mold cavity; and
means for transporting said mold from said filling means to said heating means and from said heating means to said opening and removing means, whereby said apparatus fills said mold cavity with egg yolk material and egg white material, cooks said egg material and removes said cooked egg material from said mold cavity to produce a cooked, substantially egg-shaped egg product.

2. The apparatus of claim 1, wherein:
said mold includes a plurality of said cavities therein.

3. The apparatus of claim 2, further comprising:
a plurality of said molds, said transporting means sequentially transporting said molds.

4. The apparatus of claim 3, wherein:
each said mold includes a plurality of closely mating mold sections.

5. The apparatus of claim 1, further comprising:
means for cleaning said mold cavity when said cooked egg product is removed from said mold cavity.

6. An apparatus for cooking egg products comprising:
a selectively openable and closeable mold having a plurality of mold cavities;
means for filling said mold cavity with egg material;
means for heating said mold;

means for opening said mold and removing cooked egg product from said mold cavity;

means for transporting said mold from said filling means to said heating means and from said heating means to said opening and removing means;

means for cleaning said mold cavity when aid cooked egg product is removed from said mold cavity, said cleaning means comprising a cleaning utensil for each said mold cavity, and means for advancing said cleaning utensils into said mold cavities and withdrawing said cleaning utensils from said mold cavities, whereby said apparatus fills said mold cavity with egg material, cooks said egg material and removes said cooked egg material from said mold cavity to produce a cooked, substantially egg-shaped egg product.

7. The apparatus of claim 6, wherein:
said mold includes a plurality of mold sections; and
said cleaning means comprising a plurality of cleaning utensils for each said mold cavity, said cleaning utensils of each mold cavity adapted for advancement into different ones of said mold sections.

8. The apparatus of claim 7, wherein:
said cleaning means comprises a scraping utensil and a brush utensil for each said mold cavity, said advancing and withdrawing means adapted to first advance said scraping utensil into said mold cavity and then advance said brush utensil into said mold cavity.

9. The apparatus of claim 8, wherein:
said cleaning means comprises a first set of a first scraping utensil and a first brush utensil and a second set of a second scraping utensil and a second brush utensil for each said mold cavity, said first set adapted for advancement into one of said mold sections and said second set adapted for advancement into another of said mold sections.

10. The apparatus of claim 6, wherein:
said transporting means sequentially transports said molds from said opening and removing means to said filling means; and
said cleaning means is adapted to move with said molds for a predetermined distance between said opening and removing means and said filling means, and for cleaning said molds while moving therewith.

11. The apparatus of claim 1, further comprising:
a plurality of said molds; and
said transporting means continuously conveys said molds between said filling means, said heating means and said opening and removing means.

12. An apparatus for cooking egg products comprising:
a plurality of selectively openable and closable molds, each said mold having at least one substantially egg-shaped mold cavity;
means for filling said mold cavity with egg material;
means for heating said mold;
means for opening said mold and removing cooked egg product from said mold cavity;
means for transporting said mold from said filling means to said heating means and from said heating means to said opening and removing means, said transporting means continuously conveying said molds between said filling means, said heating means and said opening and removing means; and
said filling means adapted to move with said molds a predetermined distance between said mold opening and removing means and said heating means, and for filling said molds while moving therewith whereby said apparatus fills said mold cavity with egg material, cooks said egg material and removes said cooked egg material from said mold cavity to produce a cooked, substantially egg-shaped egg product.

13. The apparatus of claim 12, wherein:
said cleaning means is adapted to move with said molds a predetermined distance between said opening and removing means and said filling means, and for cleaning said molds while moving therewith.

14. The apparatus of claim 13, wherein:
said heating means includes an oven; and
said transporting means continuously transports said mold through said oven.

15. The apparatus of claim 1, wherein:
said heating means includes an oven; and
said transporting means continuously transports said mold through said oven.

16. An apparatus for cooking egg products comprising:
a selectively openable and closable mold having at least one substantially egg-shaped mold cavity, said mold having at least one upper mold section and at least one lower mold section;
means for filling said mold cavity with egg material;
means for heating said mold;
means for transporting said mold from said filling means to said heating means and from said heating means to said opening and removing means;
means for releasing pressure in said mold; and
means for lowering said lower mold section sufficiently to provide cooked egg product therein with the ability to drop out of said mold cavity, whereby said apparatus fills said mold cavity with egg material, cooks said egg material and removes said cooked egg material from said mold cavity to produce a cooked, substantially egg-shaped egg product.

17. The apparatus of claim 16, wherein:
said lowering means is adapted for pivoting said lower mold section downwardly to a location at which said cooked egg product drops out of said lower mold section.

18. The apparatus of claim 17, wherein:
said mold cavity has a greatest substantially horizontal diameter; and
said upper mold section and said lower mold section closely mate at said greatest substantially horizontal diameter of said mold cavity.

19. The apparatus of claim 18, further comprising
a conveying track;
said transporting means conveying said mold along said conveying track;
a first cam surface disposed to extend proximate said conveying track; and
said mold having a first follower therein coupled to said lower mold section and engaging said first cam surface, said first cam surface configured to pivotally lower said lower mold section through said first follower as said mold is transported along said conveying track.

20. The apparatus of claim 19, comprising:
said upper mold section has a mold body and a mold cover therein;
a second cam surface disposed to extend proximate said conveying track; and said mold having a second follower thereon coupled to said mold cover and engaging said second cam surface, said second cam surface configured to raise said mold cover through said second follower and thereby relieve pressure within said mold cavity prior to lowering mold section.

21. The apparatus of claim 20, wherein:
said mold cover is pivotally hinged to said mold body and said lower mold section is pivotally hinged to said mold body.

22. The apparatus of claim 17, further comprising:
a chill tank disposed beneath said opening and removing means and adapted to receive cooked egg product falling from said mold.

23. The apparatus of claim 22, further comprising:
means for conveying cooked egg product disposed in said chill tank.

24. The apparatus of claim 23 wherein:
said cooked egg product conveying means includes a plurality of aligned rotating rods.

25. The apparatus of claim 24, wherein:
said rotating rods have thereon a plurality of regions with substantially smoothly curved reduced diameters.

26. An apparatus for cooking egg products comprising:
a selectively openable and closable mold having at least one substantially egg-shaped mold cavity;
an egg material supply;
means for filling said mold cavity with egg material;
means for heating said mold;
means for opening said mold and removing cooked egg product from said mold cavity;
means for transporting said mold from said filling means to said heating means and from said heating means to said opening and removing means, said transporting means continuously conveying said molds between said filling means, said heating means and said opening and removing means;
said filling means including a fill chamber having means for seating said fill chamber on said mold;
means for advancing said fill chamber with said mold a predetermined distance between said opening and removing means and said heating means; and
means for the controlled dispensing of egg material from said egg material supply through said fill chamber when said fill chamber is heated on said mold, whereby said apparatus fills said mold cavity with egg material, cooks said egg material and removes said cooked egg material from said mold cavity to produce a cooked, substantially egg-shaped egg product.

27. The apparatus of claim 26, further comprising:
means for introducing a controlled amount of excess egg material into said mold cavity.

28. The apparatus of claim 27, wherein:
said mold having a mold cover and a mold body mating at an upper region of said mold cavity to form an upper opening thereat when said mold is in an open condition and said mold cover having an excess egg port therethrough;
said fill chamber seating means seating said fill chamber on said mold body and said fill chamber mating with said upper opening; and
a fill nozzle having means for selectively coupling said fill nozzle to said excess egg yolk and coupled to said egg material supply.

29. The apparatus of claim 28, wherein:
said upper opening has a size sufficient to permit the passage of an egg yolk.

30. The apparatus of claim 29, wherein:
said mold includes a lower mold section pivotally coupled to said mold body and said mold cover, said mold cavity extending between said lower mold section and said mold cover.

31. The apparatus of claim 30, wherein:
said mold cavity has a greatest substantially horizontal diameter;
said lower mold section and said mold body mate at said greatest substantially horizontal diameter; and
said mold cover and said mold body mate at a region above said greatest substantially horizontal diameter.

32. An apparatus for cooking egg products, comprising:
a base;
a plurality of cooking molds each having at least one substantially whole egg-shaped cavity therein, said molds linked sequentially and each mold selectively openable and closable;
a conveyor drive mechanism for conveying said molds on said base;
a mold filling assembly positioned relative said base to form a mold filling station thereon, said mold filling assembly adapted for the sequential filling of said molds with egg yolk material and egg white material;
an oven disposed relative to said base so as to form a cooking station thereon and disposed so that said molds are conveyed through said oven after said filling station;
a mold opening and egg removal assembly positioned relative said base to form an egg removal station thereon, said mold opening assembly disposed so that said molds are conveyed to said egg removal station after said oven; and
a mold cleaning assembly disposed relative to said base to form a mold cleaning station thereon, said mold cleaning assembly disposed so that said molds are conveyed to said mold cleaning station after said egg removal station and said molds are conveyed to said mold filling station after said mold cleaning station.

33. The apparatus of claim 32, wherein:
each said mold includes a plurality of substantially egg-shaped cavities therein.

34. The apparatus of claim 32, wherein:
each said mold has a lower mold section, a middle mold section and an upper mold section, said mold cavity extending between said lower mold section and said upper mold section, said conveyor drive mechanism coupled to said middle mold sections.

35. The apparatus of claim 34, wherein:
said mold cavities each have a greatest diameter that is substantially horizontal; and
said lower mold section mates with said middle mold section at said greatest diameter.

36. An apparatus for cooking egg products, comprising:
a base;
a plurality of cooking molds each having at least one substantially egg-shaped cavity therein, said molds linked sequentially and each mold selectively openable and closable, each said mold having an excess fill port that opens into said mold cavity;

a conveyor drive mechanism for conveying said molds on said base;

a mold filling assembly positioned relative said base to form a mold filling station thereon, said mold filling assembly adapted for the sequential filling of said molds;

said mold filling assembly adapted to sequentially introduce the contents of a natural egg into said mold cavities while said molds are in an open condition;

said mold filling assembly including a secondary filling assembly that is adapted to sequentially introduce egg material into said mold cavities through said excess fill port;

an open disposed relative to said base so as to form a cooking station thereon and disposed so that said molds are conveyed through said oven after said filling station;

a mold opening and egg removal assembly positioned relative said base to form an egg removal station thereon, said mold opening assembly disposed so that said molds are conveyed to said egg removal station after said oven; and a mold cleaning assembly disposed relative to said base to form a mold cleaning station thereon, said mold cleaning assembly disposed so that said molds are conveyed to said mold cleaning station after said egg removal station and said molds are conveyed to said mold filling station after said mold cleaning station.

37. The apparatus of claim 36, wherein:
said mold filling assembly moves said primary filling assembly with each said mold a predetermined distance at said mold filling station.

38. The apparatus of claim 36, wherein:
said mold filling assembly moves said secondary filling assembly with each said mold a predetermined distance at said mold filling station.

39. The apparatus of claim 36, wherein:
said primary filling assembly and said secondary filling assembly are mounted on a common carriage, said mold filling assembly adapted to move said carriage with said molds a predetermined distance at said mold filling station.

40. The apparatus of claim 39, wherein:
said mold filling assembly includes means for raising and lowering said carriage and means for advancing and retracting said carriage.

41. The apparatus of claim 40, wherein:
said conveyor drive mechanism is coupled to a first cam and a second cam, said means for raising and lowering said carriage engaging said first cam so as to be activated thereby, said means for advancing and retracting said carriage engaging said second cam so as to be activated thereby, whereby said first cam and said second cam are configured to raise and lower said primary filling assembly and said secondary filling assembly on successive molds and advance therewith a predetermined distance.

42. An apparatus for cooking egg products, comprising:
a base;
a plurality of cooking molds each having at least one substantially egg-shaped cavity therein, said molds linked sequentially and each mold selectively openable and closable, said molds each having an upper mold section and a mold body, said upper mold section coupled to said mold body to provide an opening to said mold cavity when said mold is in an open condition, an opening bracket on said upper mold section;

a conveyor drive mechanism for conveying said molds on said base;

a mold filling assembly positioned relative said base to form a mold filling station thereon, said mold filling assembly adapted for the sequential filling of said molds;

said mold filling assembly including an opening lever movably mounted on said base so as to selectively, sequentially engage said opening brackets;

means for moving said opening lever into engagement with said opening brackets and raise said opening brackets thereby;

an oven disposed relative to said base so as to form a cooking station thereon and disposed so that said molds are conveyed through said oven after said filling station;

a mold opening and egg removal assembly positioned relative said base to form an egg removal station thereon, said mold opening assembly disposed so that said molds are conveyed to said egg removal station after said oven; and a mold cleaning assembly disposed relative to said base to form a mold cleaning station thereon, said mold cleaning assembly disposed so that said molds are conveyed to said mold cleaning station after said egg removal station and said molds are conveyed to said mold filling station after said mold cleaning station.

43. The apparatus of claim 42, wherein:
said conveyor drive mechanism is coupled to an opening cam, said opening lever moving means engaging said opening cam so as to be activated thereby and sequentially open said molds.

44. An apparatus for cooking egg products, comprising:
a base;
a plurality of cooking molds each having at least one substantially egg-shaped cavity therein, said molds linked sequentially and each mold selectively openable and closable, said molds each having a mold body and a lower mold section, said lower mold section movably coupled to said mold body to provide an opening to said mold cavity when said mold is in an open condition;

a conveyor drive mechanism for conveying said molds on said base;

a mold filling assembly positioned relative said base to form a mold filling station thereon, said mold filling assembly adapted for the sequential filling of said molds;

an oven disposed relative to said base so as to form a cooking station thereon and disposed so that said molds are conveyed through said oven after said filling station;

a mold opening and egg removal assembly positioned relative said base to form an egg removal station thereon, said mold opening assembly disposed so that said molds are conveyed to said egg removal station after said oven, said mold opening and egg removal assembly including a lower mold opening surface mounted on said base, said lower mold opening surface selectively engaging each said lower mold section and lowering said lower mold section relative to said mold body until egg product therein falls out;

a mold cleaning assembly disposed relative to said base to form a mold cleaning station thereon, said mold cleaning assembly disposed so that said molds are conveyed to said mold cleaning station after said egg removal station and said molds are conveyed to said mold filling station after said mold cleaning station.

45. The apparatus of claim 44, wherein:
said lower mold opening surface selectively pivots said lower mold sections downwardly.

46. The apparatus of claim 45, further comprising:
a chill tank disposed below said molds at said egg removal station.

47. The apparatus of claim 46, wherein:
said chill tank includes a plurality of roller conveyors therein disposed so as to convey cooked egg product, said roller conveyors having a plurality of regions of smoothly reduced diameter.

48. The apparatus of claim 42, wherein:
said molds each include an upper mold section coupled to said mold body, said upper mold section movably coupled to said mold to provide an opening to said mold cavity when said mold is in an open condition; and said mold opening and egg removal assembly includes an upper mold opening surface mounted on said base, said upper mold opening surface selectively engaging each said upper mold section and raising said upper mold section sufficiently to release the pressure in said mold cavity.

49. An apparatus for cooking egg products, comprising:
a base;
a plurality of cooking molds each having at least one substantially egg-shaped cavity therein, said molds linked sequentially and each mold selectively openable and closable;
a conveyor drive mechanism for conveying said molds on said base;
a mold filling assembly positioned relative said base to form a mold filling station thereon, said mold filling assembly adapted for the sequential filling of said molds;
an oven disposed relative to said base so as to form a cooking station thereon and disposed so that said molds are conveyed through said oven after said filling station;
a mold opening and egg removal assembly positioned relative said base to form an egg removal station thereon, said mold opening assembly disposed so that said molds are conveyed to said egg removal station after said oven; and
a mold cleaning assembly disposed realtive to said base to form a mold cleaning station thereon, said mold cleaning assembly disposed so that said molds are conveyed to said mold cleaning station after said egg removal station and said molds are conveyed to said mold filling station after said mold cleaning station, said mold cleaning assembly including a cleaning utensil and utensil advancement mechanism, said utensil advancement mechanism adapted to sequentially advance said cleaning utensil into said mold cavity when said mold is in an open condition.

50. The apparatus of claim 49, wherein:
said cleaning utensil and said utensil advancement mechanism mounted on a carriage, said carriage movably mounted on said base so as to substantially follow the advancement of said molds at said mold cleaning station; and a reciprocating carrier drive mounted on said base and adapted to advance said carriage with said molds a predetermined distance at said mold cleaning station.

51. The apparatus of claim 49, wherein:
said mold cleaning assembly includes a plurality of cleaning utensils adjacently disposed, said utensil advancement mechanism adapted to substantially simultaneously advance said cleaning utensils into a plurality of adjacently disposed molds.

52. The apparatus of claim 49, wherein:
said mold cleaning assembly includes a scraping utensil and a brushing utensil, said utensil advancement mechanism adapted to sequentially advance said scraping utensil and then said brushing utensil into said molds.

53. The apparatus of claim 52, wherein:
said utensil advancement mechanism substantially simultaneously advance said scraping utensil and said brushing utensil into adjacent molds.

54. The apparatus of claim 51, wherein:
each mold includes a first mold section and a section mold section movably coupled so as to provide an opening to said mold cavity when said mold is in an open condition;

said plurality of cleaning utensils comprise a first set of utensils and said utensil advancement mechanism comprises a first utensil advancement mechanism;

a second set of utensils and a second utensil advancement mechanism; and said first set of utensils adapted for advancement into said first mold section, and said second set of utensils adapted for advancement into said second mold section.

55. The apparatus of claim 54, wherein:
said first set of utensils, said first utensil advancement mechanism, said second set of utensils and said second utensil advancement mechanism are mounted on a carriage, said carriage movably mounted on said base, so as to substantially follow the advancement of said molds at said mold cleaning station; and a reciprocating carriage drive mounted on said base and adapted to advance said carriage with said molds a predetermined distance at said mold cleaning station.

56. The apparatus of claim 52, wherein:
each mold includes a first mold section and a second mold section movably coupled so as to provide an opening to said mold cavity when said mold is in an open condition;

said scraping utensil and said brushing utensil comprise a first set of utensils and said utensil advancement mechanism comprises a first utensil advancement mechanism;

a second set of utensils and a second utensil advancement mechanism; and said first set of utensils adapted for advancement into said first mold section, and said second set of utensils adapted for advancement into said second mold section.

57. The apparatus of claim 56, wherein:

said first set of utensils, said first utensil advancement mechanism, said second set of utensils and said second utensil advancement mechanism are mounted on a carriage, said carriage movably mounted on said base, so as to substantially follow the advancement of said molds at said mold cleaning station; and a reciprocating carriage drive mounted on said base and adapted to advance said carriage with said molds a predetermined distance at said mold cleaning station.

58. An apparatus for cooking egg products, comprising:

a base;

a plurality of cooking molds each having at least one substantially egg-shaped cavity therein, said molds linked sequentially and each mold selectively openable and closable, each said mold including a first mold section and a second mold section movably coupled so as to provide an opening to said mold cavity when said mold is in an open condition;

a conveyor drive mechanism for conveying said molds on said base;

a mold filling assembly positioned relative said base to form a mold filling station thereon, said mold filling assembly adapted for the sequential filling of said molds;

an oven disposed relative to said base so as to form a cooking station thereon and disposed so that said molds are conveyed through said oven after said filling station;

a mold opening and egg removal assembly positioned relative said base to form an egg removal station thereon, said mold opening assembly disposed so that said molds are conveyed to said egg removal station after said oven; and a mold cleaning assembly disposed relative to said base to form a mold cleaning station thereon, said mold cleaning assembly disposed so that said molds are conveyed to said mold cleaning station after said egg removal station and said molds are conveyed to said mold filling station after said mold cleaning station, said mold cleaning assembly including a first cleaning utensil and a first utensil advancement mechanism adapted to sequentially advance said first cleaning utensil into said first mold sections when said mold is in an open condition, and a second cleaning utensil and a second utensil advancement mechanism adapted to sequentially advance said second cleaning utensil into said second mold sections when said mold is in an open condition.

59. An apparatus for cooking egg products, comprising:

a base;

a plurality of cooking molds each having at least one substantially egg-shaped cavity therein, said molds linked sequentially and each mold selectively openable and closable, each said mold including a lower mold section and a mold body, said lower mold section pivotally coupled to said mold body to pivot downwardly in order to provide an opening to said mold cavity when said mold is in an opening condition;

a conveyor drive mechanism for conveying said molds on said base;

a mold filling assembly positioned relative said base to form a mold filling station thereon, said mold filling assembly adapted for the sequential filling of said molds;

an oven disposed relative to said base so as to form a cooking station thereon and disposed so that said molds are conveyed through said oven after said filling station.

a mold opening and egg removal assembly positioned relative said base to form an egg removal station thereon said mold opening assembly disposed so that said molds are conveyed to said egg removal station after said oven; and a mold cleaning assembly disposed relative to said base to form a mold cleaning station thereon, said mold cleaning assembly disposed so that said molds are conveyed to said mold cleaning station after said egg removal station and said molds are conveyed to said mold filling station after said mold cleaning station;

a lift bracket mounted on said base and coupled to a raising mechanism adapted to selectively raise and lift bracket, said lift bracket disposed to selectively engage and pivotally raise said lower mold sections to a closed position by said raising mechanism after said mold cleaning station.

60. An apparatus for cooking egg products, comprising:

a base;

a plurality of cooking molds each having at least one substantially while egg-shaped cavity therein, said molds linked sequentially and each mold selectively openable and closable;

a mold transport mechanism for transporting said molds on said base;

a mold filling assembly positioned relative said base to form a mold filling station thereon, said mold filling assembly adapted for the sequential filling of said substantially whole egg-shaped cavities of said molds with egg material;

an oven disposed relative to said base so as to form a cooking station thereon and disposed so that said molds are transported through said oven after said filling station;

a mold opening and egg removal assembly positioned relative said base to form an egg removal station thereon, said mold opening assembly disposed so that said molds are transported to said egg removal station after said oven.

61. The apparatus of claim 60, wherein:

each said mold includes a plurality of substantially whole egg-shaped cavities therein.

62. The apparatus of claim 60, wherein:

each said mold has a lower mold section, a middle mold section and an upper mold section, said mold cavity extending between said lower mold section and said upper mold section, said mold transport mechanism coupled to said middle mold sections.

63. The apparatus of claim 62, wherein:

said mold cavities each have a greatest diameter that is substantially horizontal; and said lower mold section mates with said middle mold section at said greatest diameter.

64. The apparatus of claim 60, wherein:

each said mold has an excess fill port that opens into said mold cavity;

said mold filling assembly adapted to sequentially introduce the contents of a natural egg into said mold cavities while said molds are in an open conditional; and said mold filling assembly includes a secondary filling assembly that is adapted to sequentially introduce egg material into said mold cavities through said excess fill port.

65. The apparatus of claim 64, wherein:
said mold filling assembly moves said primary filling assembly with each said mold a predetermined distance at said mold filling station.

66. The apparatus of claim 64, wherein:
said mold filling assembly moves said secondary filling assembly with each said mold a predetermined distance at said mold filling station.

67. The apparatus of claim 64, wherein:
said primary filling assembly and said secondary filling assembly are mounted on a common carriage, said mold filling assembly adapted to move said carriage with said molds a predetermined distance at said mold filling station.

68. The apparatus of claim 67, wherein:
said mold filling assembly includes means for raising and lowering said carriage and means for advancing and retracting said carriage.

69. The apparatus of claim 68, wherein:
said mold transport mechanism is coupled to a first cam and a second cam, said means for raising and lowering said carriage engaging said first cam so as to be activated thereby, said means for advancing and retracting said carriage engaging said second cam so as to be activated thereby, whereby said first cam and said second cam are configured to raise and lower said primary filling assembly and said secondary filling assembly on successive molds and advance therewith a predetermined distance.

70. The apparatus of claim 60, wherein:
said molds each have an upper mold section and a mold body, said upper mold section coupled to said mold body to provide an opening to said mold cavity when said mold is in an open condition, an opening bracket on said upper mold section;
said mold filling assembly including an opening lever movably mounted on said base so as to selectively, sequentially engage said opening brackets; and
means for moving said opening lever into engagement with said opening brackets and raise said opening brackets thereby.

71. The apparatus of claim 1, wherein:
said mold transport mechanism is coupled to an opening cam, said opening lever moving means engaging said opening cam so as to be activated thereby and sequentially open said molds.

72. The apparatus of claim 60, wherein:
said molds each have a mold body and a lower mold section, said lower mold section movably coupled to said mold body to provide an opening to said mold cavity when said mold is in an open condition; and
said mold opening and egg removal assembly includes a lower mold opening surface mounted on said base, said lower mold opening surface selectively engaging each said lower mold section and lowering said lower mold section relative to said mold body until egg product therein falls out.

73. The apparatus of claim 72, wherein:
said lower mold opening surface selectively pivots said lower mold sections downwardly.

74. The apparatus of claim 73, further comprising:
a chill tank disposed below said molds at said egg removal station.

75. The apparatus of claim 74, wherein:
said chill tank includes a plurality of roller conveyors therein disposed so as to convey cooked egg product, said roller conveyors having a plurality of regions of smoothly reduced diameter.

76. The apparatus of claim 70, wherein:
said molds each include an upper mold section coupled to said mold body, said upper mold section movably coupled to said mold body to provide an opening to said mold cavity when said mold is in an open condition; and
said mold opening and egg removal assembly includes an upper mold opening surface mounted on said base, said upper mold opening surface selectively engaging each said upper mold section and raising said upper mold section sufficiently to release the pressure in said mold cavity.

* * * * *

UNITED STATES PATENT AND TRADEMARK OFFICE
CERTIFICATE OF CORRECTION

PATENT NO. : 4,862,790

DATED : September 5, 1989

INVENTOR(S) : Kornelis Platteschorre, et al.

It is certified that error appears in the above-identified patent and that said Letters Patent is hereby corrected as shown below:

Column 4, line 29;
  "section 3" should be --section 30--.

Column 5, line 61;
  "rods 8" should be --rods 82--.

Column 9, line 34;
  "so a to" should be --so as to--.

Column 10, line 46;
  "o bottom" should be --on bottom--.

Column 11, line 53;
  after "on" insert --one--.

Column 14, line 65;
  "closeable" should be --closable--.

Column 15, line 6;
  "aid" should be --said--.

Column 16, line 64;
  after "19," insert --further--.

Column 17, line 6;
  after "lowering" insert --of said lower--

UNITED STATES PATENT AND TRADEMARK OFFICE
CERTIFICATE OF CORRECTION

PATENT NO.  : 4,862,790

DATED       : September 5, 1989

INVENTOR(S) : Kornelis Platteschorre, et al.

It is certified that error appears in the above-identified patent and that said Letters Patent is hereby corrected as shown below:

Column 19, line 15;
      "open" should be --oven--.
    Column 21, line 24;
      after "mold" insert --body--.
    Column 22, line 6;
      "carrier" should be --carriage--.
    Column 22, line 24;
      "advance" should be --advances--.
    Column 22, line 27;
      "section" (second occurrence) should be --second--.
    Column 23, line 63;
      "opening" should be --open--.
    Column 24, line 6;
      "." should be --;--.
    Column 24, line 29;
      "while" should be --whole--.
    Column 26, line 4;
      "1" should be --70--.

Signed and Sealed this

Fourteenth Day of May, 1991

*Attest:*

HARRY F. MANBECK, JR.

*Attesting Officer*      *Commissioner of Patents and Trademarks*